US012676277B2

(12) United States Patent　　　(10) Patent No.:　US 12,676,277 B2

Ide　　　　　　　　　　　　　　　(45) Date of Patent:　Jul. 7, 2026

(54) SLIDING BEARING UNIT AND ROTATING ANODE X-ray TUBE

(71) Applicant: CANON ELECTRON TUBES & DEVICES CO., LTD., Otawara (JP)

(72) Inventor: Hideki Ide, Otawara (JP)

(73) Assignee: CANON ELECTRON TUBES & DEVICES CO., LTD., Otawara-shi (JP)

( * ) Notice: Subject to any disclaimer, the term of this patent is extended or adjusted under 35 U.S.C. 154(b) by 217 days.

(21) Appl. No.: 18/752,881

(22) Filed: Jun. 25, 2024

(65) Prior Publication Data

US 2024/0347308 A1　　Oct. 17, 2024

Related U.S. Application Data

(63) Continuation of application No. PCT/JP2022/026730, filed on Jul. 5, 2022.

(30) Foreign Application Priority Data

Dec. 27, 2021　(JP) ................................. 2021-212344

(51) Int. Cl.
　　*H01J 35/10*　　　(2006.01)
　　*F16C 17/02*　　　(2006.01)
　　　　　　(Continued)

(52) U.S. Cl.
　　CPC ............ *H01J 35/104* (2019.05); *F16C 17/02* (2013.01); *F16C 17/026* (2013.01);
　　　　　　(Continued)

(58) Field of Classification Search
　　CPC ..... H01J 35/104; F16C 17/107; F16C 33/103; F16C 2380/16; F16C 2210/08;
　　　　　　(Continued)

(56) References Cited

U.S. PATENT DOCUMENTS

| | | | |
|---|---|---|---|
| 5,210,781 A | 5/1993 | Ono et al. | |
| 5,583,907 A * | 12/1996 | Ono ....................... | H01J 35/104 |
| | | | 378/132 |
| 7,245,700 B2 * | 7/2007 | Vadari ................... | F16C 17/026 |
| | | | 378/133 |
| 9,449,783 B2 * | 9/2016 | Hunt ...................... | H01J 35/104 |
| 11,017,977 B1 * | 5/2021 | Hunt ..................... | H01J 35/104 |

(Continued)

FOREIGN PATENT DOCUMENTS

| | | |
|---|---|---|
| GB | 1432880 | 4/1976 |
| JP | 5-13029 A | 1/1993 |

(Continued)

OTHER PUBLICATIONS

Extended European Search Report issued Nov. 26, 2025 in European Patent Application No. 22915419.0, citing references 1 and 2 therein, 8 pages.
International Search Report issued Aug. 30, 2022 in PCT/JP2022/026730 filed on Jul. 5, 2022, citing documents 1-2 & 18-20 therein, 2 pages.

*Primary Examiner* — Chih-Cheng Kao

(74) *Attorney, Agent, or Firm* — Oblon, McClelland, Maier & Neustadt, L.L.P.

(57) ABSTRACT

According to one embodiment, a sliding bearing unit includes a stationary shaft, a rotating body, and a lubricant. A second distance is equal to or longer than a first distance. A second gap is formed between a first inner peripheral surface and a second outer peripheral surface. A first opening opens in a bottom surface of a capture concave surface. A second opening opens in the second outer peripheral surface. The second gap connects a through hole to a first gap.

16 Claims, 14 Drawing Sheets

(51) Int. Cl.
 *F16C 17/10* (2006.01)
 *F16C 33/10* (2006.01)
 *F16C 33/74* (2006.01)

(52) U.S. Cl.
 CPC .......... *F16C 17/107* (2013.01); *F16C 33/103* (2013.01); *F16C 33/107* (2013.01); *F16C 33/1085* (2013.01); *F16C 33/74* (2013.01); *F16C 33/745* (2013.01); *F16C 33/748* (2013.01); *F16C 2380/16* (2013.01)

(58) Field of Classification Search
 CPC .. F16C 17/026; F16C 33/107; F16C 33/1085; F16C 33/74; F16C 33/745; F16C 33/748; F16C 17/02
 See application file for complete search history.

(56) References Cited

U.S. PATENT DOCUMENTS 11,670,475 B2 * 6/2023 Hunt ..................... H01J 35/104
378/133

FOREIGN PATENT DOCUMENTS

| JP | 11-213927 A | 8/1999 |
| JP | 2005-108511 A | 4/2005 |
| JP | 2012-104402 A | 5/2012 |
| JP | 2016-9617 A | 1/2016 |
| JP | 2021-157874 A | 10/2021 |
| WO | WO 2016/077049 A1 | 5/2016 |

* cited by examiner

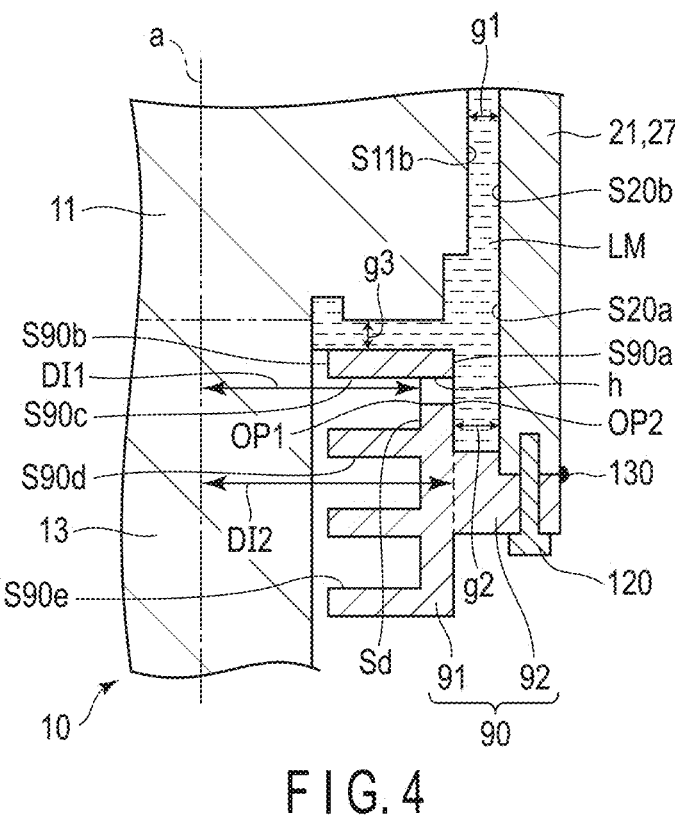
F I G. 4
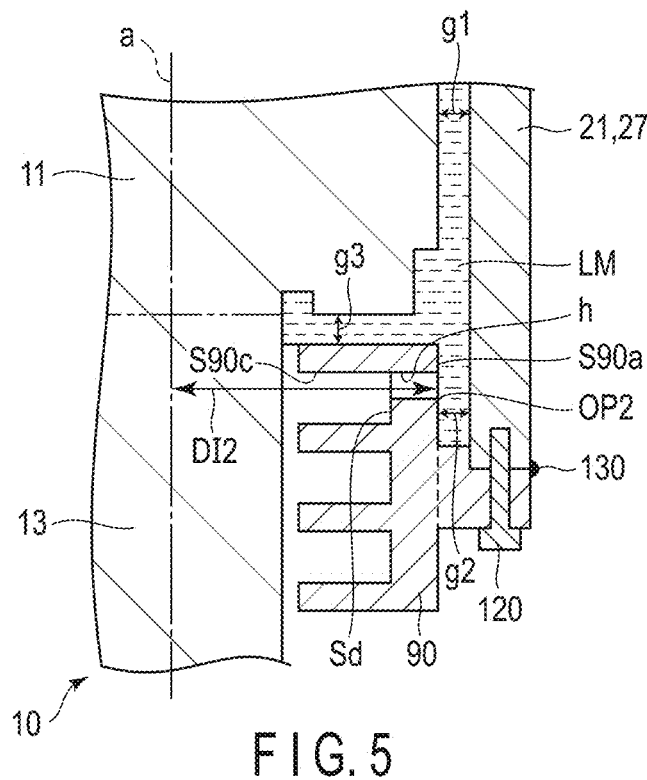
F I G. 5

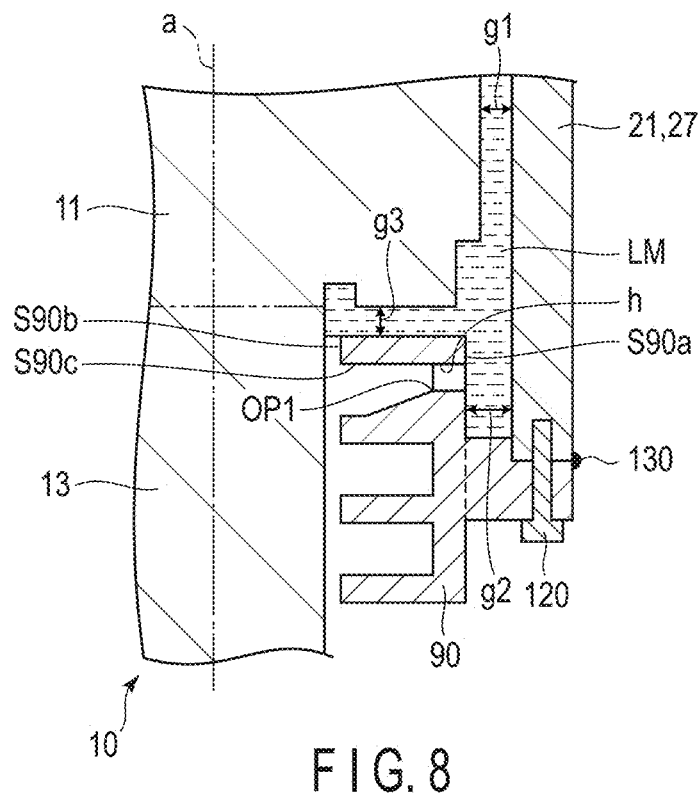
F I G. 8
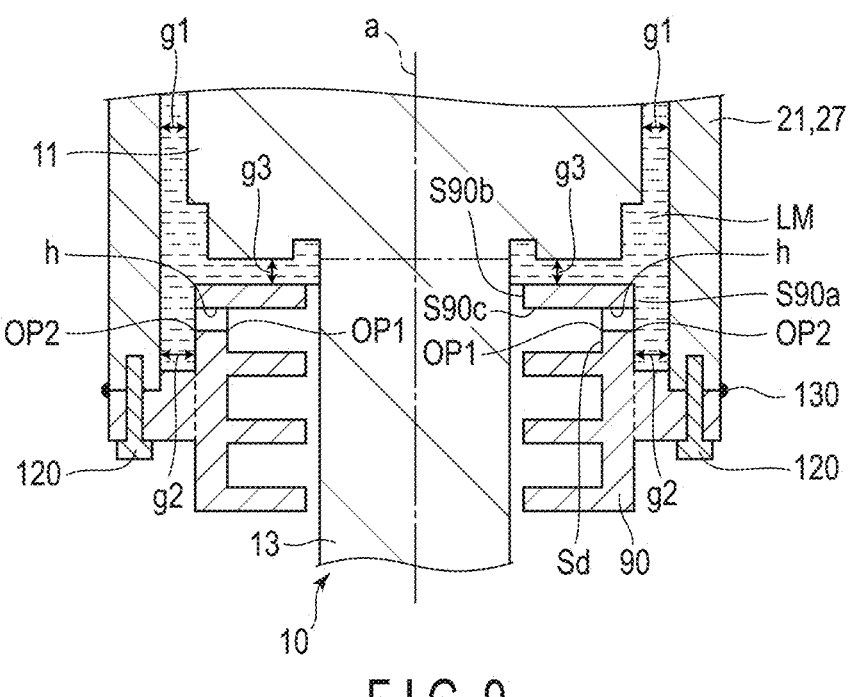
F I G. 9

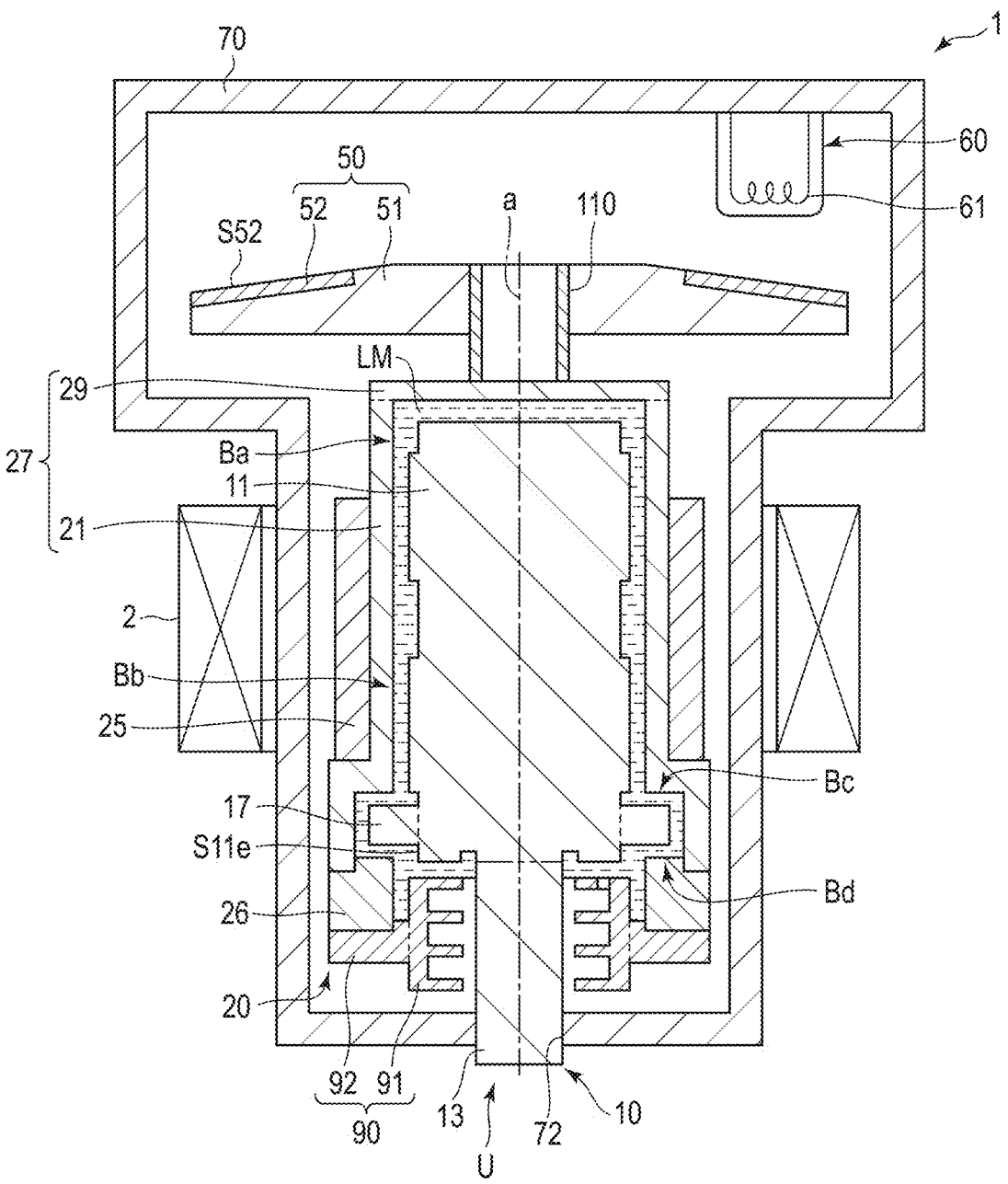
F I G. 10

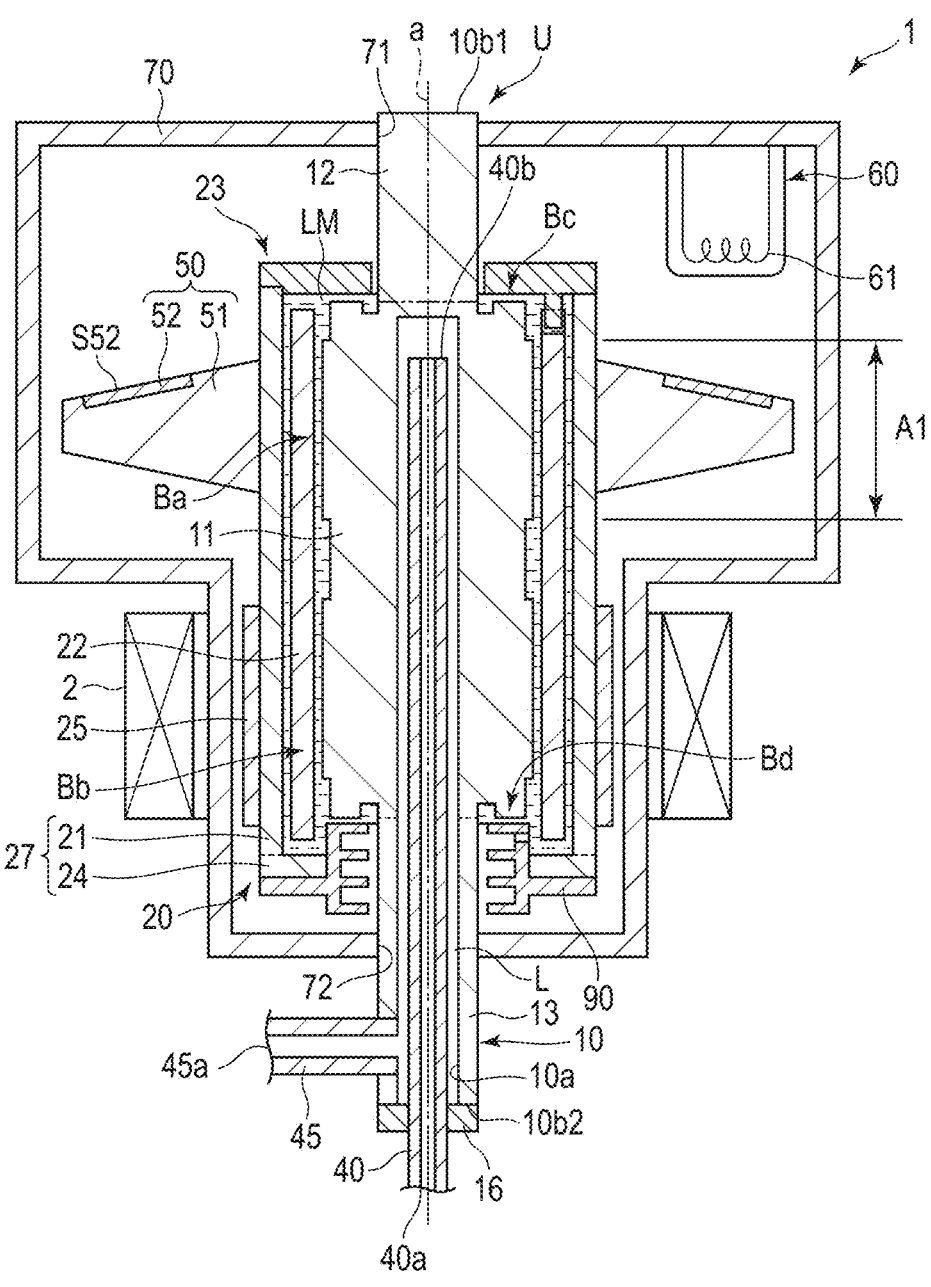
F I G. 13

SLIDING BEARING UNIT AND ROTATING ANODE X-ray TUBE

CROSS-REFERENCE TO RELATED APPLICATIONS

This application is a Continuation Application of PCT Application No. PCT/JP2022/026730, filed Jul. 5, 2022 and based upon and claiming the benefit of priority from Japanese Patent Application No. 2021-212344, filed Dec. 27, 2021, the entire contents of all of which are incorporated herein by reference.

FIELD

Embodiments described herein relate generally to a sliding bearing unit and a rotating anode x-ray tube

BACKGROUND

In general, an X-ray tube assembly is used as an X-ray source in medical and industrial equipment that uses X-rays to diagnose a subject. As the X-ray tube assembly, a rotating anode X-ray tube assembly including a rotating anode X-ray tube is known.

The rotating anode X-ray tube assembly includes a rotating anode X-ray tube that emits X-rays, a stator coil and a housing that houses the rotating anode X-ray tube and the stator coil. The rotating anode X-ray tube includes a stationary shaft, a cathode that generates electrons, an anode target, a rotating body and an envelope. The rotating body is formed in a cylindrical shape. The anode target is fixed to the rotating body. A gap between the stationary shaft and the rotating body is filled with lubricant. The rotating anode X-ray tube uses dynamic pressure sliding bearings. The rotating body rotates with the anode target due to a magnetic field generated by the stator coil. Furthermore, X-rays are emitted when electrons emitted from the cathode collide with the anode target.

BRIEF DESCRIPTION OF THE DRAWINGS

FIG. 4 is an enlarged sectional view showing part of the X-ray tube according to the first embodiment, and showing the stationary shaft and a rotating body.

FIG. 5 is an enlarged sectional view showing part of an X-ray tube according to modification 1 of the first embodiment, and showing a stationary shaft and a rotating body.

FIG. 8 is an enlarged sectional view showing part of an X-ray tube according to modification 4 of the first embodiment, and showing a stationary shaft and a rotating body.

FIG. 9 is an enlarged sectional view showing part of an X-ray tube according to modification 5 of the first embodiment, and showing a stationary shaft and a rotating body.

FIG. 10 is a sectional view showing an X-ray tube assembly according to a second embodiment.

FIG. 13 is a sectional view showing an X-ray tube assembly according to a third embodiment.

DETAILED DESCRIPTION

Figure 1:
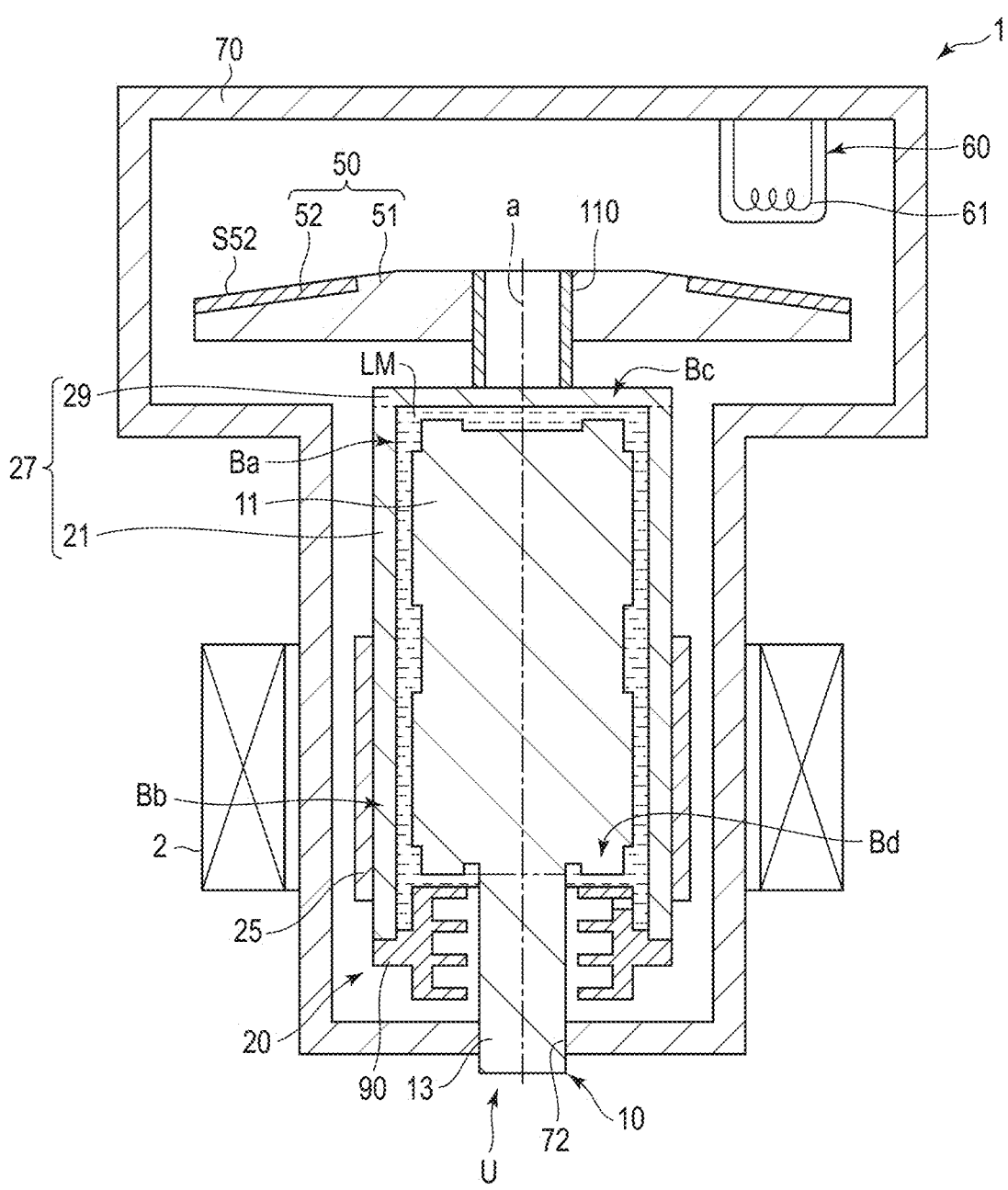
FIG. 1 is a sectional view showing an X-ray tube assembly according to a first embodiment.

In general, according to one embodiment, there is provided a sliding bearing unit comprising: a stationary shaft extending along a rotation axis and including a large-diameter section having a first radial bearing surface on a first outer peripheral surface and a small-diameter section integrally formed with the large-diameter section as one unit and having a second outer diameter that is smaller than a first outer diameter of the large-diameter section; a rotating body that is rotatable around the stationary shaft; and a lubricant. The rotating body includes a rotating main body extending along the rotation axis to be formed in a cylindrical shape, located around the large-diameter section, and having a second radial bearing surface on a first inner peripheral surface, and a sealing member fixed to the rotating main body, formed in a cylindrical shape, located around the small-diameter section, and having a second outer peripheral surface, a second inner peripheral surface, a capture concave surface that opens in the second inner peripheral surface and is recessed toward the second outer peripheral surface to capture the lubricant, and a through hole. The lubricant is filled in a gap between the stationary shaft and the rotating body, and forms a radial sliding bearing of a dynamic pressure type together with the first radial bearing surface and the second radial bearing surface. The through hole has a first opening that opens in the capture concave surface and a second opening that opens in a surface other than the second inner peripheral surface and the capture concave surface of the sealing member, is formed through the sealing member from the first opening to the second opening, and connects a space surrounded by the capture concave surface to a first gap between the first radial bearing surface and the second radial bearing surface. Assuming in a direction perpendicular to the rotation axis, a longest distance from the rotation axis to the first opening is set as a first distance and a longest distance from the rotation axis to the second opening is set as a second distance, the second distance is equal to or longer than the first distance. A second gap is formed between the first inner peripheral surface and the second outer peripheral surface. The capture concave surface includes a bottom surface located alongside the second outer peripheral surface. The first opening opens in the bottom surface of the capture concave surface. The second opening opens in the second outer peripheral surface. The second gap connects the through hole to the first gap.

According to another embodiment, there is provided a sliding bearing unit comprising: a stationary shaft extending along a rotation axis and including a large-diameter section having a first radial bearing surface on a first outer peripheral surface and a small-diameter section integrally formed with the large-diameter section as one unit and having a second outer diameter that is smaller than a first outer diameter of the large-diameter section; a rotating body that is rotatable around the stationary shaft; and a lubricant. The rotating body includes a rotating main body extending along the rotation axis to be formed in a cylindrical shape, located around the large-diameter section, and having a second radial bearing surface on a first inner peripheral surface, and a sealing member fixed to the rotating main body, formed in a cylindrical shape, located around the small-diameter section, and having a second outer peripheral surface, a second inner peripheral surface, a capture concave surface that opens in the second inner peripheral surface and is recessed toward the second outer peripheral surface to capture the lubricant, and a through hole. The lubricant is filled in a gap between the stationary shaft and the rotating body, and forms a radial sliding bearing of a dynamic pressure type together with the first radial bearing surface and the second radial bearing surface. The through hole has a first opening that opens in the capture concave surface and a second opening that opens in a surface other than the second inner peripheral surface and the capture concave surface of the sealing member, is formed through the sealing member from the first opening to the second opening, and connects a space surrounded by the capture concave surface to a first gap between the first radial bearing surface and the second radial bearing surface. Assuming in a direction perpendicular to the rotation axis, a longest distance from the rotation axis to the first opening is set as a first distance and a longest distance from the rotation axis to the second opening is set as a second distance, the second distance is equal to or longer than the first distance. The stationary shaft further includes a flange section which is located alongside the first outer peripheral surface and integrally formed with the large-diameter section as one unit. The flange section includes a first thrust bearing surface and a third thrust bearing surface located opposite to the first thrust bearing surface in a direction along the rotation axis. The rotating body has a second thrust bearing surface opposed to the first thrust bearing surface and a fourth thrust bearing surface opposed to the third thrust bearing surface. The lubricant forms a first thrust sliding bearing of a dynamic pressure type together with the first thrust bearing surface and the second thrust bearing surface. The lubricant forms a second thrust sliding bearing of a dynamic pressure type together with the third thrust bearing surface and the fourth thrust bearing surface. A third gap is formed between the large-diameter section and the sealing member in a direction along the rotation axis. The capture concave surface includes a bottom surface located alongside the second outer peripheral surface. The sealing member includes an annular section having a first end surface that is part of the capture concave surface and a second end surface which is located opposite to the first end surface in the direction along the rotation axis and opposed to the large-diameter section. The first opening opens in at least one of the first end surface and the bottom surface of the capture concave surface. The second opening opens in the second end surface, is opposed to the large-diameter section, and is not opposed to the first thrust bearing surface or the third thrust bearing surface. The third gap connects the through hole to the first gap.

According to another embodiment, there is provided a rotating anode X-ray tube comprising: a sliding bearing unit including a stationary shaft extending along a rotation axis and including a large-diameter section having a first radial bearing surface on a first outer peripheral surface and a small-diameter section integrally formed with the large-diameter section as one unit and having a second outer diameter that is smaller than a first outer diameter of the large-diameter section, a rotating body that is rotatable around the stationary shaft, and a lubricant; an anode target fixed to the rotating body; a cathode opposed to the anode target; and an envelope which houses the sliding bearing unit, the anode target and the cathode and which fixes the stationary shaft. The rotating body includes a rotating main body extending along the rotation axis to be formed in a cylindrical shape, located around the large-diameter section, and having a second radial bearing surface on a first inner peripheral surface, and a sealing member fixed to the rotating main body, formed in a cylindrical shape, located around the small-diameter section, and having a second outer peripheral surface, a second inner peripheral surface, a capture concave surface that opens in the second inner peripheral surface and is recessed toward the second outer peripheral surface to capture the lubricant, and a through hole. The lubricant is filled in a gap between the stationary shaft and the rotating body, and forms a radial sliding bearing of a dynamic pressure type together with the first radial bearing surface and the second radial bearing surface. The through hole has a first opening that opens in the capture concave surface and a second opening that opens in a surface other than the second inner peripheral surface and the capture concave surface of the sealing member, is formed through the sealing member from the first opening to the second opening, and connects a space surrounded by the capture concave surface to a first gap between the first radial bearing surface and the second radial bearing surface. Assuming in a direction perpendicular to the rotation axis, a longest distance from the rotation axis to the first opening is set as a first distance and a longest distance from the rotation axis to the second opening is set as a second distance, the second distance is equal to or longer than the first distance. A second gap is formed between the first inner peripheral surface and the second outer peripheral surface. The capture concave surface includes a bottom surface located alongside the second outer peripheral surface. The first opening opens in the bottom surface of the capture concave surface. The second opening opens in the second outer peripheral surface. The second gap connects the through hole to the first gap.

According to another embodiment, there is provided a rotating anode X-ray tube comprising: a sliding bearing unit including a stationary shaft extending along a rotation axis and including a large-diameter section having a first radial bearing surface on a first outer peripheral surface and a small-diameter section integrally formed with the large-diameter section as one unit and having a second outer diameter that is smaller than a first outer diameter of the large-diameter section, a rotating body that is rotatable around the stationary shaft, and a lubricant; an anode target fixed to the rotating body; a cathode opposed to the anode target; and an envelope which houses the sliding bearing unit, the anode target and the cathode and which fixes the stationary shaft. The rotating body includes a rotating main body extending along the rotation axis to be formed in a cylindrical shape, located around the large-diameter section, and having a second radial bearing surface on a first inner peripheral surface, and a sealing member fixed to the rotating main body, formed in a cylindrical shape, located around the small-diameter section, and having a second outer peripheral surface, a second inner peripheral surface, a capture concave surface that opens in the second inner peripheral surface and is recessed toward the second outer peripheral surface to capture the lubricant, and a through hole. The lubricant is filled in a gap between the stationary shaft and the rotating body, and forms a radial sliding bearing of a dynamic pressure type together with the first radial bearing surface and the second radial bearing surface. The through hole has a first opening that opens in the capture concave surface and a second opening that opens in a surface other than the second inner peripheral surface and the capture concave surface of the sealing member, is formed through the sealing member from the first opening to the second opening, and connects a space surrounded by the capture concave surface to a first gap between the first radial bearing surface and the second radial bearing surface. Assuming in a direction perpendicular to the rotation axis, a longest distance from the rotation axis to the first opening is set as a first distance and a longest distance from the rotation axis to the second opening is set as a second distance, the second distance is equal to or longer than the first distance. The stationary shaft further includes a flange section which is located alongside the first outer peripheral surface and integrally formed with the large-diameter section as one unit. The flange section includes a first thrust bearing surface and a third thrust bearing surface located opposite to the first thrust bearing surface in a direction along the rotation axis. The rotating body has a second thrust bearing surface opposed to the first thrust bearing surface and a fourth thrust bearing surface opposed to the third thrust bearing surface. The lubricant forms a first thrust sliding bearing of a dynamic pressure type together with the first thrust bearing surface and the second thrust bearing surface. The lubricant forms a second thrust sliding bearing of a dynamic pressure type together with the third thrust bearing surface and the fourth thrust bearing surface. A third gap is formed between the large-diameter section and the sealing member in a direction along the rotation axis. The capture concave surface includes a bottom surface located alongside the second outer peripheral surface. The sealing member includes an annular section having a first end surface that is part of the capture concave surface and a second end surface which is located opposite to the first end surface in the direction along the rotation axis and opposed to the large-diameter section. The first opening opens in at least one of the first end surface and the bottom surface of the capture concave surface. The second opening opens in the second end surface, is opposed to the large-diameter section, and is not opposed to the first thrust bearing surface or the third thrust bearing surface. The third gap connects the through hole to the first gap.

Embodiments will be described hereinafter with reference to the accompanying drawings. The disclosure is merely an example, and proper changes within the spirit of the inventions, which are easily conceivable by a skilled person, are included in the scope of the inventions as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the inventions. Besides, in the specification and drawings, the same or similar elements as or to those described in connection with preceding drawings or those exhibiting similar functions are denoted by like reference numerals, and a detailed description thereof is omitted unless otherwise necessary.

As each of the following embodiments, a sliding bearing unit and a rotating anode X-ray tube assembly provided with the sliding bearing unit will be described. The rotating anode X-ray tube assembly includes a rotating anode X-ray tube and the like. Hereinafter, the rotating anode X-ray tube assembly will simply be referred to as an X-ray tube assembly, and the rotating anode X-ray tube will simply be referred to as an X-ray tube. The X-ray tube includes a sliding bearing unit, an anode target, a cathode and an envelope. The sliding bearing unit includes a stationary shaft, a rotating body and a liquid metal (metal lubricant) as a lubricant, and uses a sliding bearing.

First Embodiment

Figure 2:
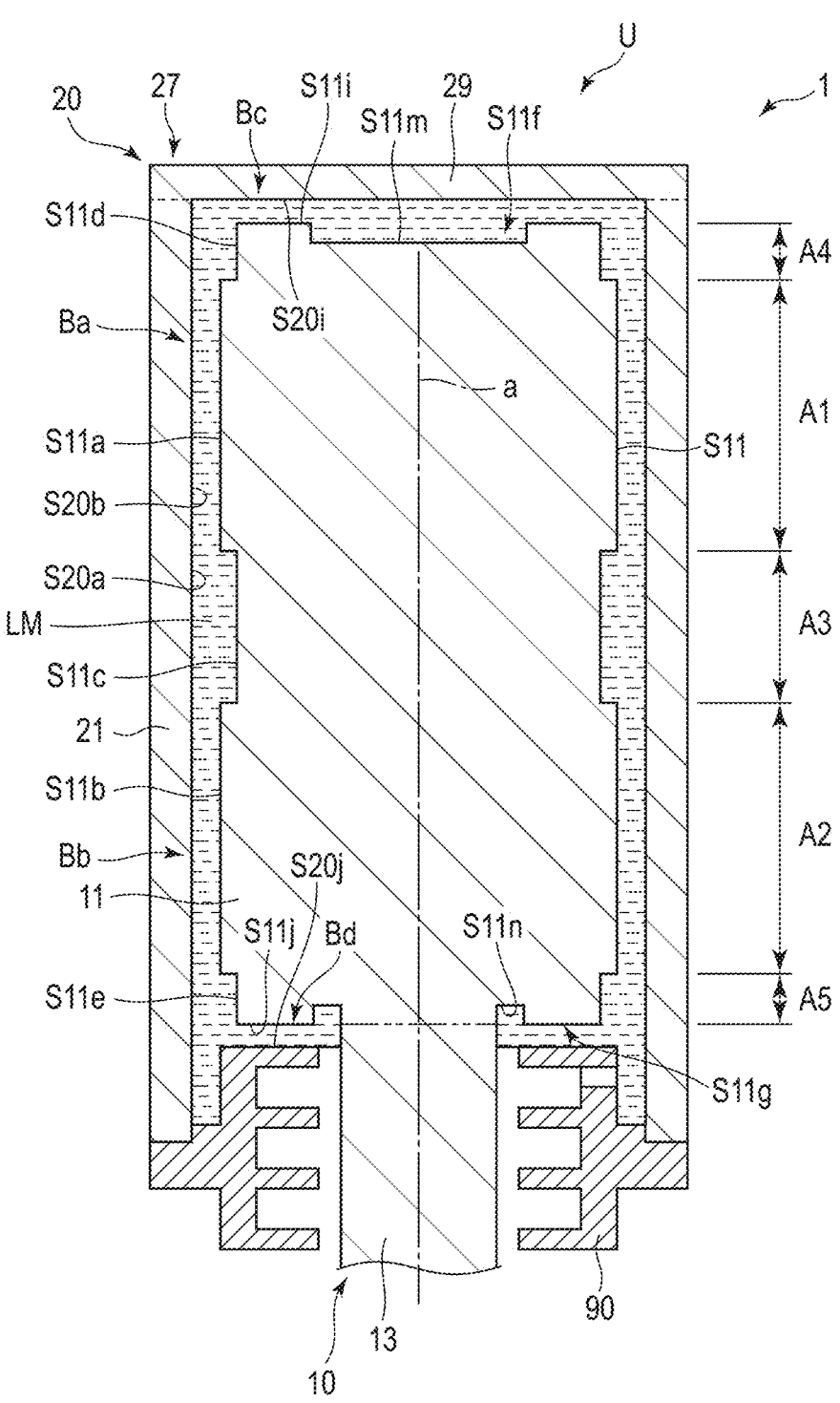
FIG. 2 is an enlarged sectional view showing part of an X-ray tube shown in FIG. 1.
Figure 3:
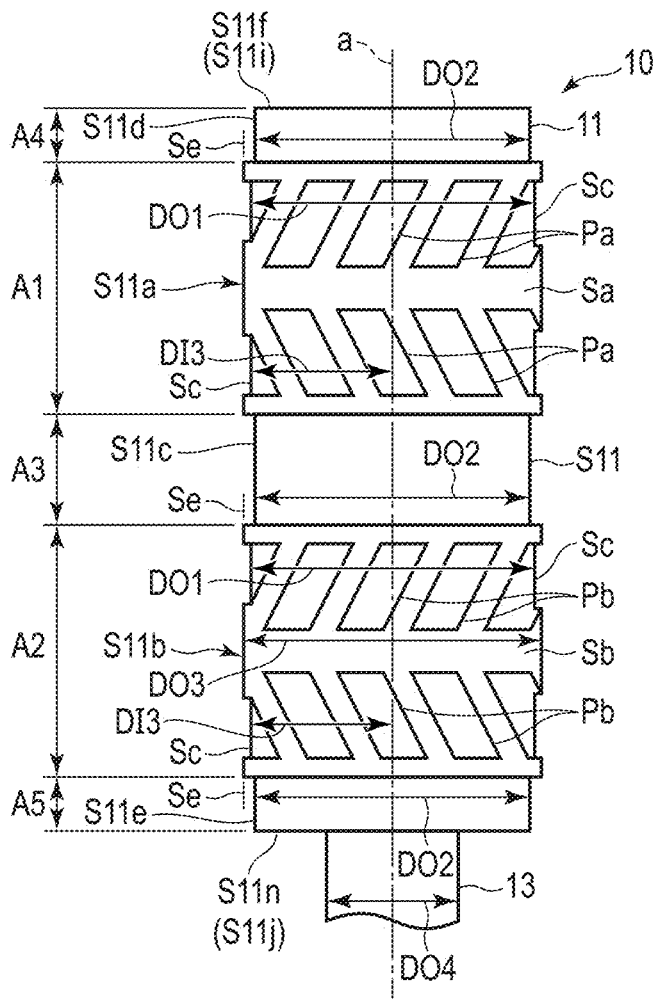
FIG. 3 is a side elevational view showing part of a stationary shaft shown in FIG. 1.

First, an X-ray tube assembly according to a first embodiment will be described. FIG. 1 is a sectional view showing the X-ray tube assembly according to the first embodiment. FIG. 2 is an enlarged sectional view showing part of an X-ray tube 1 shown in FIG. 1. FIG. 3 is a side elevational view showing part of a stationary shaft 10 shown in FIG. 1. FIG. 4 is an enlarged sectional view showing part of the X-ray tube 1 according to the first embodiment, and showing the stationary shaft 10 and a rotating body 20.

As shown in FIG. 1, the X-ray tube assembly includes the X-ray tube 1, which is of a rotating anode type, a stator coil 2 as a coil that generates a magnetic field, and the like. The X-ray tube 1 includes a sliding bearing unit U, an anode target 50, a cathode 60 and an envelope 70. The sliding bearing unit U includes a stationary shaft 10, a rotating body 20 and a liquid metal LM as a lubricant, and uses a sliding bearing.

As shown in FIGS. 1 to 3, the stationary shaft 10 is formed in a columnar shape, extends along a rotation axis a, and has radial bearing surfaces S11$a$ and S11$b$ that are formed on the outer peripheral surface. The stationary shaft 10 includes a large-diameter section 11 and a small-diameter section 13. The large-diameter section 11 and small-diameter section 13 are formed coaxially and integrally as one unit. The stationary shaft 10 is formed of metal such as an iron (Fe) alloy and a molybdenum (Mo) alloy.

The large-diameter section 11 of the stationary shaft 10 is located in areas A1, A2, A3, A4 and A5 arranged along the rotation axis a. The area A2 is spaced from the area A1 in a direction along the rotation axis a. The area A3 is located between the areas A1 and A2 and adjacent to each of the areas A1 and A2. The area A4 is located beyond the area A1 from the area A3 and adjacent to the area A1. The area A5 is located beyond the area A2 from the area A3 and adjacent to the area A2.

The large-diameter section 11 is formed in a columnar shape and has an outer peripheral surface S11. The outer peripheral surface S11 has a radial bearing surface S11$a$, a radial bearing surface S11$b$, a concave surface S11$c$, a concave surface S11$d$ and a concave surface S11$e$. The large-diameter section 11 also has one end surface S11$f$ and another end surface S11$g$ located opposite to the one end surface S11$f$ in the direction along the rotation axis a.

The one end surface S11$f$ has a thrust bearing surface S11$i$ and a concave surface S11$m$. The concave surface S11$m$ opens in the one end surface S11$f$ and is concave toward the other end surface S11$g$. When the one end surface S11$f$ is viewed from the direction along the rotation axis a, the thrust bearing surface S11$i$ has an annular shape, and the concave surface S11$m$ has a circular shape and is surrounded by the thrust bearing surface S11$i$.

The other end surface S11$g$ has a thrust bearing surface S11$j$ and a concave surface S11$n$. The thrust bearing surface S11$j$ is opposed to a sealing member 90 to be described later. The concave surface S11$n$ opens in the other end surface S11$g$ and is concave toward the one end surface S11$f$. When the other end surface S11$g$ is viewed from the direction along the rotation axis a, the thrust bearing surface S11$j$ has an annular shape, and the concave surface S11$n$ has an annular shape and is surrounded by the thrust bearing surface S11$j$. Note that the small-diameter section 13 is continuously formed from an area surrounded by the concave surface S11$n$ in the other end surface S11$g$.

The radial bearing surface S11$a$ and the radial bearing surface S11$b$ are each formed all over the outer peripheral surface S11 of the large-diameter section 11. In the first embodiment, the concave surfaces S11$c$, S11$d$ and S11$e$ are each formed all over the outer peripheral surface S11 of the large-diameter section 11. However, the concave surfaces S11$c$, S11$d$ and S11$e$ may be formed intermittently in the circumferential direction.

The radial bearing surface S11$a$ is formed in the large-diameter section 11 in the area A1. The radial bearing surface S11$b$ is formed in the large-diameter section 11 in the area A2. The radial bearing surfaces S11$a$ and S11$b$ are spaced in the direction along the rotation axis a.

The radial bearing surface S11$a$ has a plain surface Sa and a plurality of raking concave surfaces (a plurality of pattern sections) Pa. The plain surface Sa has a smooth outer peripheral surface. The raking concave surfaces Pa are each formed to open in the plain surface Sa, to be concave toward the rotation axis a, and to rake a liquid metal LM. The raking concave surfaces Pa are formed by recessing the plain surface Sa and arranged all over the outer peripheral surface S11 of the large-diameter section 11 in the area A1. Each raking concave surface Pa is arranged so as to extend diagonally with respect to the circumferential direction. The raking concave surfaces Pa each include a bottom surface Sc located alongside the rotation axis a.

In the direction along the rotation axis a, the raking concave surfaces Pa are spaced from each other. However, the raking concave surfaces Pa may be connected in the direction along the rotation axis a. In addition, among the raking concave surfaces Pa, raking concave surfaces Pa alongside the concave surface S11$c$ are not in contact with the concave surface S11$c$, but they may be in contact with the concave surface S11$c$. Similarly, among the raking concave surfaces Pa, raking concave surfaces Pa alongside the concave surface S11$d$ are not in contact with the concave surface S11$d$, but they may be in contact with the concave surface S11$d$.

The radial bearing surface S11$b$ has a plain surface Sb and a plurality of raking concave surfaces (a plurality of pattern sections) Pb. The plain surface Sb has a smooth outer peripheral surface. The raking concave surfaces Pb are each formed to open in the plain surface Sb, to be concave toward the rotation axis a, and to rake a liquid metal LM. The raking concave surfaces Pb are formed by recessing the plain surface Sb and arranged all over the outer peripheral surface S11 of the large-diameter section 11 in the area A2. Each raking concave surface Pb is arranged so as to extend diagonally with respect to the circumferential direction. The raking concave surfaces Pb each include a bottom surface Sc located alongside the rotation axis a.

In the direction along the rotation axis a, the raking concave surfaces Pb are spaced from each other. However, the raking concave surfaces Pb may be connected in the direction along the rotation axis a. In addition, among the raking concave surfaces Pb, raking concave surfaces Pb alongside the concave surface S11$c$ are not in contact with the concave surface S11$c$, but they may be in contact with the concave surface S11$c$. Similarly, among the raking concave surfaces Pb, raking concave surfaces Pb alongside the concave surface S11$e$ are not in contact with the concave surface S11$e$, but they may be in contact with the concave surface S11$e$.

The raking concave surfaces Pa and Pb are each formed by a groove having a depth of several tens of micrometers. The raking concave surfaces Pa and Pb are each formed into a herringbone pattern. Thus, the radial bearing surfaces S11$a$ and S11$b$ are each an uneven surface, and the liquid metal LM can be raked therein to produce dynamic pressure easily.

The concave surface S11$c$ is formed in a large-diameter section 11 in the area A3. The concave surface S11$d$ is formed in the large-diameter section 11 in the area A4. The concave surface S11$e$ is formed in a large-diameter section 11 in the area A5. The concave surfaces S11$c$, S11$d$ and S11$e$ are spaced from each other in the direction along the rotation axis a and are separated from the radial bearing surfaces S11$a$ and S11$b$.

The concave surface S11$c$ is formed side by side with the radial bearing surfaces S11$a$ and S11$b$ in the direction along the rotation axis a. The concave surface S11$d$ is formed side by side with the radial bearing surface S11$a$ in the direction along the rotation axis a. The concave surface S11$e$ is formed side by side with the radial bearing surface S11$b$ in the direction along the rotation axis a. The concave surfaces S11$c$, S11$d$ and S11$e$ are each a smooth outer peripheral surface and a plain surface.

Note that the stationary shaft 10 may include a shelter and a plurality of through holes connected to the shelter. The shelter is an internal space of the stationary shaft 10 filled with an appropriate amount of liquid metal LM. The through holes include one or more through holes opened to the concave surface S11$c$.

The plurality of through holes further include one or more through holes opened to the concave surface S11$d$.

Alternatively, the plurality of through holes further include one or more through holes opened to not the concave surface S11$d$ but the concave surface S11$e$.

Alternatively, the plurality of through holes further include one or more through holes opened to the concave surface S11$d$ and one or more through holes opened to the concave surface S11$e$.

The shelter and the plurality of through holes can form a circulation path for the liquid metal LM.

The concave surfaces S11$c$, S11$d$ and S11$e$ are formed to be recessed compared with the radial bearing surfaces S11$a$ and S11$b$. In other words, the concave surfaces S11$c$, S11$d$ and S11$e$ are located closer to the rotation axis a than the virtual extension surface Se of the plain surfaces Sa and Sb. Furthermore, in other words, in the stationary shaft 10, the outer diameter DO2 of the section where the concave surfaces S11$c$, S11$d$ and S11$e$ are formed is smaller than the smallest outer diameter DO1 of the outer diameters of the sections where the radial bearing surfaces S11$a$ and S11$b$ are formed.

In the direction perpendicular to the rotation axis a, a gap between the concave surface (concave surfaces S11$c$, S11$d$, S11$e$) and the rotating body 20 is larger than a gap between the radial bearing surface S11$a$ (plain surface Sa) and the rotating body 20 and is larger than a gap between the radial bearing surface S11*b* (plain surface Sb) and the rotating body 20.

In the first embodiment, in the direction perpendicular to the rotation axis a, a gap between the radial bearing surface S11*a* (plain surface Sa) and the rotating body 20 (inner peripheral surface S20*a*) and a gap between the radial bearing surface S11*b* (plain surface Sb) and the rotating body 20 are each 10 μm to 40 μm. Note that the gap may be less than 10 μm. In addition, in the direction perpendicular to the rotation axis a, the gap between the concave surface (concave surfaces S11*c*, S11*d*, S11*e*) and the rotating body 20 is 0.1 mm to 3 mm.

The space between the concave surface S11*c* and the rotating body 20, the space between the concave surface S11*d* and the rotating body 20, and the space between the concave surface S11*e* and the rotating body 20 can be caused to function as a reservoir that stores the liquid metal LM. Since the liquid metal LM can be supplied to each of the radial bearing surfaces S11*a* and S11*b* from both sides, gaps of the bearings can be prevented from being depleted of the liquid metal LM.

It is possible to prevent the contact between the radial bearing surface of the stationary shaft 10 and that of the rotating body 20, which occurs when the liquid metal LM becomes thin the gaps of the bearings or when the liquid metal LM no longer exists. It is also possible to prevent a foreign matter, which is obtained by shaving at least one of the bearing surfaces, from being generated and thus to prevent the foreign matter from being mixed into the liquid metal LM.

The small-diameter section 13 is formed in a columnar shape and is located alongside one end of the large-diameter section 11. The small-diameter section 13 has an outer diameter DO4 that is smaller than the outer diameter (the outer diameter of the plain surface Sa or the outer diameter of the plain surface Sb) DO3 of the large-diameter section 11. The small-diameter section 13 is located closer to the rotation axis a than the thrust bearing surface S11*j*.

As shown in FIGS. 1 and 2, the rotating body 20 is configured rotatably around the stationary shaft 10. The rotating body 20 includes a rotating main body 27, a sealing member 90 and a cylindrical section 25. The rotating main body 27 and the sealing member 90 are each formed of metal such as a Fe alloy and a Mo alloy. The cylindrical section 25 is formed of metal such as copper (Cu) and a copper alloy.

The rotating main body 27 includes a first cylinder 21 and a lid section 29.

The first cylinder 21 extends along the rotation axis a, is formed in a cylindrical shape, and is located around the stationary shaft 10 (large-diameter section 11). In the first embodiment, the first cylinder 21 has uniform inner and outer diameters throughout its entire length. The first cylinder 21 has an inner peripheral surface S20*a*. The inner peripheral surface S20*a* includes a radial bearing surface S20*b*. The radial bearing surface S20*b* is located at least in the areas A1 and A2. In the first embodiment, the radial bearing surface S20*b* is a smooth inner peripheral surface and a plain surface.

The lid section 29 is formed in a disk shape integrally with the first cylinder 21 as one unit, and liquid-tightly closes one end side of the first cylinder 21. The lid section 29 includes a thrust bearing surface S20*i* opposed to the thrust bearing surface S11*i* of the stationary shaft 10 in the direction along the rotation axis a.

As shown in FIGS. 2 and 4, the sealing member 90 is fixed to the rotating main body 27, formed in a cylindrical shape, and located around the small-diameter section 13. The sealing member 90 includes a cylindrical section 91 and a flange section 92. The cylindrical section 91 includes an outer peripheral surface S90*a*, an inner peripheral surface S90*b*, a plurality of capture concave surfaces S90*c*, S90*d* and S90*e*, and a through hole h.

The sealing member 90 also includes a thrust bearing surface S20*j* opposed to the thrust bearing surface S11*j* of the stationary shaft 10.

The gap (clearance) between the inner peripheral surface S90*b* of the sealing member 90 and the stationary shaft 10 (small-diameter section 13) is set to a value capable of maintaining rotation of the rotating body 20 and preventing the liquid metal LM from leaking. From the above, the gap is slight, and the sealing member 90 (cylindrical section 91) functions as a labyrinth seal ring. The gap between the inner peripheral surface S90*b* and the small-diameter section 13 in the direction perpendicular to the rotation axis a falls within a range of 50 μm to 300 μm.

The capture concave surfaces S90*c*, S90*d* and S90*e* each open in the inner peripheral surface S90*b*, and is configured to be recessed toward the outer peripheral surface S90*a* and to capture the liquid metal LM. The capture concave surfaces S90*c*, S90*d* and S90*e* are each formed all over the inner peripheral surface S90*b* of the cylindrical section 91. In this case, the capture concave surfaces S90*c*, S90*d* and S90*e* are each a circular groove. The capture concave surfaces S90*c*, S90*d* and S90*e* each include a bottom surface located alongside the outer peripheral surface S90*a*. For example, the capture concave surface S90*c* includes a bottom surface Sd.

Of the capture concave surfaces S90*c*, S90*d* and S90*e*, the capture concave surface S90*c* is closest to the large-diameter section 11 and the capture concave surface S90*e* is farthest from the large-diameter section 11. In the direction along the rotation axis a, the capture concave surface S90*d* is located between the capture concave surfaces S90*c* and S90*e*.

The sealing member 90 need not have a plurality of capture concave surfaces S90*c*, S90*d* and S90*e*. The sealing member 90 has only to have at least the capture concave surface S90*c*.

The through hole h has a first opening OP1 opened in the capture concave surface S90*c* and a second opening OP2 opened in a surface other than the inner peripheral surface S90*b* and the capture concave surfaces S90*c*, S90*d* and S90*e* of the sealing member 90 (cylindrical section 91). The through hole h is formed through the sealing member 90 (cylindrical section 91) from the first opening OP1 to the second opening OP2.

Assuming here that a gap between the radial bearing surface S11*b* of the stationary shaft 10 and the radial bearing surface S20*b* of the rotating body 20 is set as a first gap g1, the through hole h connects the space surrounded by the capture concave surface S90*c* to the first gap g1.

In the first embodiment, the first opening OP1 opens in the bottom surface Sd of the capture concave surface S90*c*. The second opening OP2 opens in the outer peripheral surface S90*a*. The outer peripheral surface S90*a* of the sealing member 90 is surrounded by the inner peripheral surface S20*a* of the rotating body 20 with a gap therebetween. Assuming here that in the sliding bearing unit U, the gap between the inner and outer peripheral surfaces S20*a* and S90*a* is set as a second gap g2, the second gap g2 connects the through hole h to the first gap g1. In the present embodiment, g2 is larger than g1. The upper limit of the second gap g2 may be about 3 mm.

Note that the second gap g2 can be caused to function as a reservoir that stores the liquid metal LM. Since the liquid metal LM can be supplied to each of radial sliding bearing Bb and thrust sliding bearing Bd from both sides, the bearings can be prevented from being depleted of the liquid metal LM.

The flange section 92 has an annular shape, surrounds the entire circumference of the outer peripheral surface S90a, and is formed continuously from and integrally with the outer peripheral surface S90a. The flange section 92 of the sealing member 90 is fixed to the first cylinder 21. For example, as in the first embodiment, an annular step portion may be formed on the outer peripheral side of the flange section 92 in order to fix the relative position of the sealing member 90 to the first cylinder 21. The step portion of the flange section 92 can be fitted to the first cylinder 21.

The sealing member 90 is fixed to the rotating main body 27 (first cylinder 21) using a screw 120. The first cylinder 21 and the sealing member 90 are welded at the entire boundary therebetween. Since the gap between the first cylinder 21 and the sealing member 90 can be closed liquid-tightly by a welding section 130, the liquid metal LM can be prevented from leaking through the gap between the first cylinder 21 and the sealing member 90.

As shown in FIGS. 1 and 2, the cylindrical section 25 is bonded to the outer peripheral surface of the first cylinder 21 and is fixed to the first cylinder 21. Note that in FIG. 2, the cylindrical section 25 is not shown.

When the sliding bearing unit U is assembled, the stationary shaft 10 is fitted into an integral object of the first cylinder 21 and lid section 29. Then, the sealing member 90 is fixed to the first cylinder 21 in order to cover it with the sealing member 90.

In the present embodiment, the lid section 29 is integrally formed with the first cylinder 21 as one unit, but the lid section 29 may be physically independent of the first cylinder 21.

The stationary shaft 10 and the rotating body 20 are spaced from each other in a totally opposed area. The large-diameter section 11 is covered with the rotating body 20. The small-diameter section 13 protrudes to the outside of the rotating body 20. The stationary shaft 10 rotatably supports the rotating body 20.

The liquid metal LM is filled in a gap between the stationary shaft 10 (large-diameter section 11) and the rotating body 20. As the liquid metal LM, a material such as a gallium-indium (GaIn) alloy and a gallium-indium-tin (GaInSn) alloy can be used. An appropriate amount of liquid metal LM is filled in the gap. During the operation of the rotating body 20, the liquid surface alongside the rotation axis a of the liquid metal LM is located closer to the rotation axis a than the bottom surface Sc of each of the radial bearing surfaces S11a and S11b. Thus, the gaps of the bearings can be prevented from being depleted of the liquid metal LM.

The liquid metal LM forms a sliding bearing of a dynamic pressure type together with the bearing surface of the stationary shaft 10 and the bearing surface of the rotating body 20.

The liquid metal LM forms a radial sliding bearing Ba of a dynamic pressure type together with the radial bearing surface S11a and the radial bearing surface S20b. The radial sliding bearing Ba is located in the area A1.

The liquid metal LM forms a radial sliding bearing Bb of a dynamic pressure type together with the radial bearing surface S11b and the radial bearing surface S20b. The radial sliding bearing Bb is located in the area A2.

The liquid metal LM forms a thrust sliding bearing Bc of a dynamic pressure type together with the thrust bearing surface S11i and the thrust bearing surface S20i.

The liquid metal LM forms a thrust sliding bearing Bd of a dynamic pressure type together with the thrust bearing surface S11j and the thrust bearing surface S20j.

As shown in FIG. 1, the anode target 50 is formed in an annular shape and is provided coaxially with the stationary shaft 10 and the rotating body 20. The anode target 50 includes an anode target main body 51 and a target layer 52, which is provided on part of the outer surface of the anode target main body 51. The anode target main body 51 is formed in an annular shape. The anode target main body 51 is fixed to the rotating body 20 and integrally formed with the rotating body 20 as one unit.

In the present embodiment, the anode target main body 51 is indirectly fixed to the rotating main body 27 (lid section 29) via a cylindrical connecting portion 110, and is integrally formed with the connecting portion 110 and the rotating main body 27. The connecting portion 110 is formed of metal such as a Mo alloy. The connecting portion 110 functions as a heat insulating portion to make it difficult to transfer heat from the anode target 50 to the rotating body 20.

The anode target main body 51 is formed of Mo, tungsten (W) or an alloy using these materials. The target layer 52 has a target surface (electron collision surface) S52 on which electrons collide from the cathode. The melting point of metal that forms the target layer 52 is the same as that of metal that forms the anode target main body 51 or higher than that of metal that forms the anode target main body 51. In the first embodiment, the anode target main body 51 is formed of a Mo alloy, and the target layer 52 is formed of a W alloy.

The anode target 50 is rotatable with the rotating body 20. If electrons collide with the target surface S52 of the target layer 52, a focal spot is formed on the target surface S52. Accordingly, the anode target 50 emits X-rays from the focal spot.

The cathode 60 is spaced from the target layer 52 of the anode target 50 and is opposed to the anode target 50 (target layer 52). The cathode 60 is attached to the inner wall of the envelope 70. The cathode 60 includes a filament 61 as an electron emission source that emits electrons to irradiate the target layer 52.

The envelope 70 is formed in a cylindrical shape. The envelope 70 is made of glass, ceramic and metal. The outer diameter of the portion of the envelope 70 which is opposed to the anode target 50 is larger than the outer diameter of the portion of the envelope 70 which is opposed to the cylindrical section 25. The envelope 70 has an opening 72. The envelope 70 is sealed and holds the sliding bearing unit U, the anode target 50, the connecting portion 110 and the cathode 60. The inside of the envelope 70 is maintained in a vacuum state (decompressed state).

In order to maintain the airtight state of the envelope 70, the opening 72 is airtightly bonded to the small-diameter section 13 of the stationary shaft 10. In this embodiment, the X-ray tube 1 adopts a bearing structure supported at one-end. The envelope 70 fixes the small-diameter section 13 of the stationary shaft 10. That is, the small-diameter section 13 functions as a single-sided support section for the bearings.

The stator coil 2 is opposed to the outer peripheral surface of the rotating body 20, more specifically, the outer peripheral surface of the cylindrical section 25, and surrounds the envelope 70. The stator coil 2 has an annular shape. The stator coil 2 generates a magnetic field to be applied to the cylindrical section 25 (the rotating body 20) to rotate the rotating body 20 and the anode target 50.

In the operation state of the X-ray tube assembly, the stator coil 2 generates a magnetic field to be applied to the rotating body 20 (especially the cylindrical section 25) and thus the rotating body 20 rotates. Accordingly, the anode target 50 rotates together with the rotating body 20. In addition, a current is supplied to the cathode 60, a negative voltage is applied to the cathode 60, and a relatively positive voltage is applied to the anode target 50.

The potential of each of the rotating body 20 and the stationary shaft 10 is the same as the potential of the anode target 50. In the case of an anode grounded X-ray tube, the anode target 50, the rotating body 20, the stationary shaft 10, and the metal part of the envelope (not shown) have grounding potential.

Accordingly, a potential difference is caused between the cathode 60 and the anode target 50. The filament 61 emits electrons. The electrons are accelerated and collide with the target surface S52. Thus, a focal spot is formed on the target surface S52 and emits X-rays when it collides with the electrons. The electrons (thermoelectrons) that collide with the anode target 50 are converted into X-rays, and the remaining electrons are converted into thermal energy. Note that the electron emission source of the cathode 60 is not limited to a filament, but may be, for example, a flat emitter. The X-ray tube 1 may be a cold cathode X-ray tube instead of a hot cathode X-ray tube.

As shown in FIGS. 2 and 4, the liquid metal LM may be extruded from the bearing (e.g., thrust sliding bearing Bd) in the operating state of the sliding bearing unit U. For example, during the operation of the X-ray tube 1, gas expands between the stationary shaft 10 and the rotating body 20 and thus part of the liquid metal LM, together with the gas, may be ejected instantaneously from the gap between the stationary shaft 10 and the rotating body 20 to the outside of the bearing.

However, the stationary shaft 10 has a concave surface S11$n$. Even though the gas and the liquid metal LM are extruded from the bearing toward the small-diameter section 13 of the stationary shaft 10, the impact of the extruded gas and the liquid metal LM can be absorbed by the concave surface S11$n$.

Note that forming the concave surface S11$n$ on the stationary shaft 10 makes it possible to form the thrust bearing surface S11$j$ on the other end surface S11$g$ with high accuracy.

In addition, the sliding bearing unit U includes the sealing member 90. Therefore, even if the liquid metal LM is extruded between the inner peripheral surface S90$b$ of the sealing member 90 and the small-diameter section 13, the capture concave surfaces S90$c$, S90$d$ and S90$e$ of the sealing member 90 can capture the extruded liquid metal LM.

It is thus possible to reduce the liquid metal LM from leaking outside the sliding bearing unit U. Since the liquid metal LM is reduced from scattering into the envelope 70, a discharge that may occur in the X-ray tube 1 can be reduced from being generated, accordingly, the product life of the X-ray tube 1 can be lengthened and the product reliability of the X-ray tube 1 can be improved. The X-ray tube 1 can continue its operation without losing the function.

The through hole h connects the space surrounded by the capture concave surface S90$c$ to the first gap g1 and the third gap g3 through the second gap g2. The third gap g3 is a gap between the large-diameter section 11 and the sealing member 90 in the direction along the rotation axis a. The through hole h constitutes a circulation path of the liquid metal LM together with the capture concave surface S90$c$, the second gap g2 and the like. If the liquid metal LM is captured by the capture concave surface S90$c$, the liquid metal LM can be used again for the bearings. Therefore, the bearings can be reduced from being depleted of the liquid metal LM.

Here is a description of the dimensions of the stationary shaft 10 and the sealing member 90.

Assume that as shown in FIGS. 3 and 4, in the direction perpendicular to the rotation axis a, the longest distance from the rotation axis a to the first opening OP1 of the through hole h is set as a first distance DI1, the longest distance from the rotation axis a to the second opening OP2 of the through hole h is set as a second distance DI2, and the distance from the rotation axis a to the bottom surface Sc of each of the raking concave surfaces Pa and Pb is set as a third distance DI3.

The second distance DI2 is equal to or longer than the first distance DI1. The centrifugal force can move the liquid metal LM from the first opening OP1 to the second opening OP2 through the through hole h. Since the liquid metal LM can be moved from the interior of the capture concave surface S90$c$ to the second gap g2 through the through hole h, the liquid metal LM can be circulated satisfactorily.

The third distance DI3 is equal to or longer than the first distance DI1. Compared with the case where the third distance DI3 is shorter than the first distance DI1, the liquid metal LM can be supplied satisfactorily from inside the capture concave surface S90$c$ toward the raking concave surfaces Pa and Pb. Thus, during the operation of the rotating body 20, the liquid surface alongside the rotation axis a of the liquid metal LM is easily located alongside the rotation axis a from the bottom surface Sc of each of the raking concave surfaces Pa and Pb, and the bearings (radial sliding bearings Ba and Bb) can be reduced from being depleted of the liquid metal LM.

In addition, the third distance DI3 is equal to or longer than the second distance DI2. In the present embodiment, the third distance DI3 exceeds the second distance DI2. Compared with the case where the third distance DI3 is shorter than the second distance DI2, the liquid metal LM can be supplied satisfactorily from inside the through hole h toward the raking concave surfaces Pa and Pb. Thus, the bearings can be further reduced from being depleted of the liquid metal LM.

As described above, an X-ray tube assembly with the X-ray tube 1 is formed.

According to the X-ray tube assembly according to the first embodiment configured as described above, the X-ray tube assembly includes a rotating anode X-ray tube 1. The X-ray tube 1 includes a sliding bearing unit U, an anode target 50, a cathode 60, an envelope 70, and the like. The sliding bearing unit U includes a stationary shaft 10, a rotating body 20 rotatable around the stationary shaft 10, a liquid metal LM, and the like. The stationary shaft 10 includes a large-diameter section 11 extending along the rotation axis a and having radial bearing surfaces S11$a$ and S11$b$ on the outer peripheral surface S11 and a small-diameter section 13 having an outer diameter DO4 that is smaller than the outer diameter DO3 of the large-diameter section 11.

The rotating body 20 includes a rotating main body 27 and a sealing member 90. The rotating main body 27 is formed in a cylindrical shape extending along the rotation axis a, is located around the large-diameter section 11, and includes a radial bearing surface S20$b$ on the inner peripheral surface S20$a$. The sealing member 90 is fixed to the rotating main body 27, is formed in a cylindrical shape, is located around the small-diameter section 13, and includes an outer periph-eral surface S90a, an inner peripheral surface S90b and the capture concave surfaces S90c, S90d and S90e which are opened to the inner peripheral surface S90b and recessed toward the outer peripheral surface 90a to capture the liquid metal LM, and a through hole h.

The liquid metal LM is filled in the gap between the stationary shaft 10 and the rotating body 20. The liquid metal LM forms a radial sliding bearing Ba of dynamic pressure type together with the radial bearing surfaces S11a and S20b. The liquid metal LM forms a radial sliding bearing Bb of dynamic pressure type together with the radial bearing surfaces S11b and S20b.

The through hole h has a first opening OP1 opened in the capture concave surface S90c and a second opening OP2 opened in a surface other than the inner peripheral surface S90b and the capture concave surfaces S90c, S90d and S90e of the sealing member 90. The through hole h penetrates the sealing member 90 from the first opening OP1 to the second opening OP2 and connects the space surrounded by the capture concave surface S90c to the first gap g1 between the radial bearing surfaces S11b and S20b.

The through hole h constitutes a circulation path of the liquid metal LM together with the capture concave surface S90c and the like. If the liquid metal LM is captured by the capture concave surface S90c, the liquid metal LM can be used again for the bearings. Therefore, the bearings can be reduced from being depleted of the liquid metal LM.

The first opening OP1 of the through hole h is formed at a position farthest from the rotation axis a in the capture concave surface S90c. It is thus possible to avoid the situation in which the liquid metal LM is left in the space surrounded by the capture concave surface S90c.

From the above, the sliding bearing unit U capable of obtaining satisfactory bearing operation over a long period of time and the X-ray tube 1 with the sliding bearing unit can be obtained.

Modification 1 of First Embodiment

Next is a description of modification 1 of the first embodi-ment. The X-ray tube 1 (sliding bearing unit U) is configured in the same manner as that of the first embodiment, except for the configuration to be described in modification 1. FIG. 5 is an enlarged sectional view showing part of the X-ray tube 1 according to modification 1 and also showing a stationary shaft 10 and a rotating body 20.

As shown in FIG. 5, the third distance DI3 may be the same as the second distance DI2. In modification 1, g2 is equal to g1. Liquid metal LM can be supplied satisfactorily from inside a through hole h to raking concave surfaces Pa and Pb. The bearings can be further reduced from being depleted of the liquid metal LM.

In addition, modification 1 can bring about the same advantages as those of the first embodiment.

Modification 2 of First Embodiment

Figure 6:
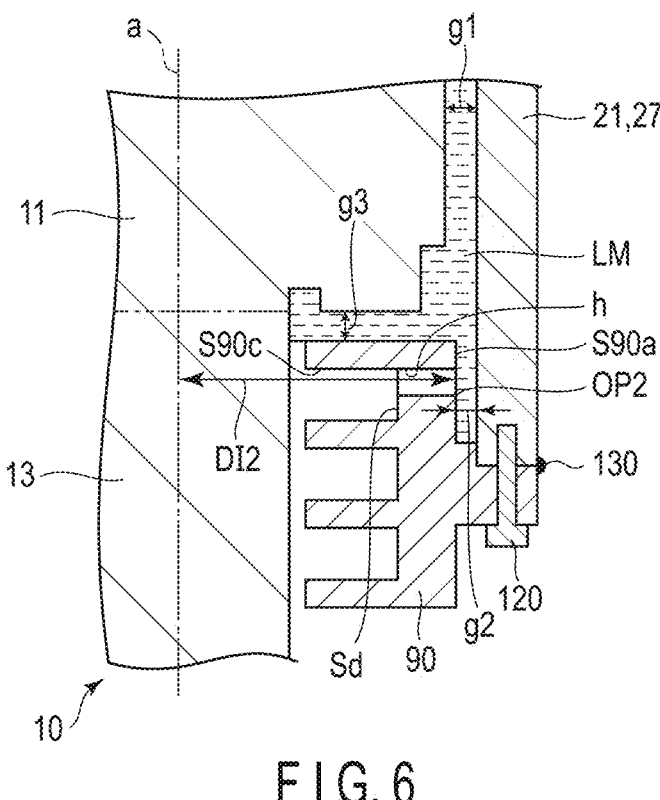
FIG. 6 is an enlarged sectional view showing part of an X-ray tube according to modification 2 of the first embodiment, and showing a stationary shaft and a rotating body.

Next is a description of modification 2 of the first embodi-ment. The X-ray tube 1 (sliding bearing unit U) is configured in the same manner as that of the first embodiment, except for the configuration to be described in modification 2. FIG. 6 is an enlarged sectional view showing part of the X-ray tube 1 according to modification 2 and also showing a stationary shaft 10 and a rotating body 20.

As shown in FIG. 6, third distance DI3 may be shorter than second distance DI2 because of the fluidity of liquid metal LM, and g2 is smaller than g1. In this modification 2, the through hole h constitutes a circulation path of the liquid metal LM together with a capture concave surface S90c and the like. Therefore, modification 2 can bring about the same advantages as those of the first embodiment.

Modification 3 of First Embodiment

Figure 7:
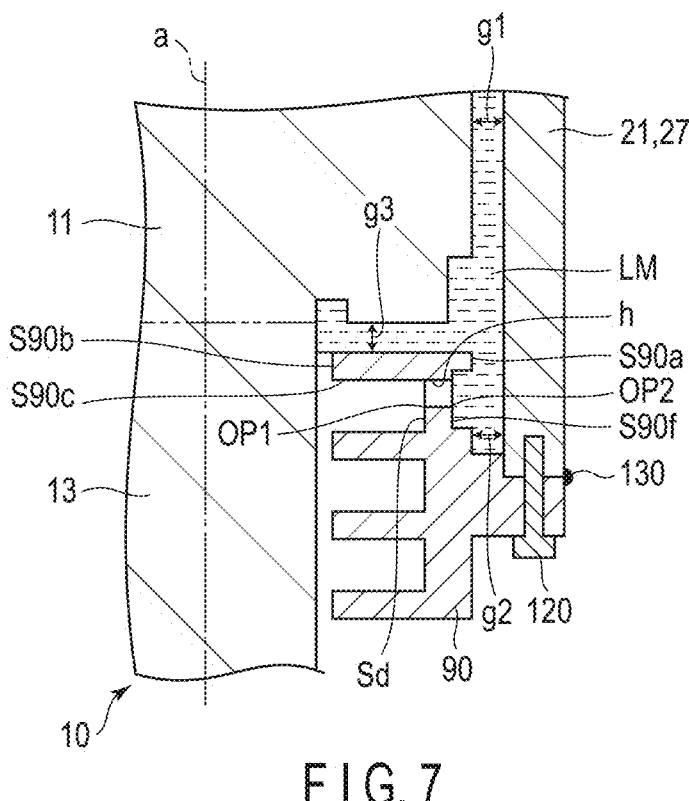
FIG. 7 is an enlarged sectional view showing part of an X-ray tube according to modification 3 of the first embodiment, and showing a stationary shaft and a rotating body.

Next is a description of modification 3 of the first embodi-ment. The X-ray tube 1 (sliding bearing unit U) is configured in the same manner as that of the first embodiment, except for the configuration to be described in modification 3. FIG. 7 is an enlarged sectional view showing part of the X-ray tube 1 according to modification 3 and also showing a stationary shaft 10 and a rotating body 20.

As shown in FIG. 7, the sealing member 90 may have a reservoir concave surface S90f that is opened in the outer peripheral surface S90a and recessed toward the inner peripheral surface S90b. The reservoir concave surface S90f can store a liquid metal LM. The second opening OP2 of a through hole h opens in the reservoir concave surface S90f. The reservoir concave surface S90f and the second gap g2 connect the through hole h to the first and third gaps g1 and g3.

According to modification 3, the liquid metal LM can be stored in a space surrounded by the reservoir concave surface S90f in addition to the second gap g2. The bearings can be further reduced from being depleted of the liquid metal LM. In addition, the present modification 3 can bring about the same advantages as those of the first embodiment.

Modification 4 of First Embodiment

Next is a description of modification 4 of the first embodi-ment. The X-ray tube 1 (sliding bearing unit U) is configured in the same manner as that of the first embodiment, except for the configuration to be described in modification 4. FIG. 8 is an enlarged sectional view showing part of the X-ray tube 1 according to modification 4 and also showing a stationary shaft 10 and a rotating body 20.

As shown in FIG. 8, the volume of space enclosed by the capture concave surface S90c may gradually decrease from the inner peripheral surface S90b toward the outer peripheral surface S90a. The liquid metal LM captured by the capture concave surface S90c can be easily directed toward the first opening OP1 of the through hole h. In addition, the present modification 4 can bring about the same advantages as those of the first embodiment.

Modification 5 of First Embodiment

Next is a description of modification 5 of the first embodi-ment. The X-ray tube 1 (sliding bearing unit U) is configured in the same manner as that of the first embodiment, except for the configuration to be described in modification 5. FIG. 9 is an enlarged sectional view showing part of the X-ray tube 1 according to modification 5 and also showing a stationary shaft 10 and a rotating body 20.

As shown in FIG. 9, the sealing member 90 may include a plurality of through holes h. Each of the through holes h has a first opening OP1 opened in the bottom surface Sd of the capture concave surface S90c and a second opening OP2 opened in the outer peripheral surface S90a of the sealing member 90. In this modification 5, the sealing member 90 includes two through holes h, but may include three or more through holes h. Compared with the case where the sealing member 90 has one through hole h, the liquid metal LM captured by the capture concave surface S90c can easily be returned toward the bearings. In addition, the present modification 5 can bring about the same advantages as those of the first embodiment.

Second Embodiment

Figure 11:
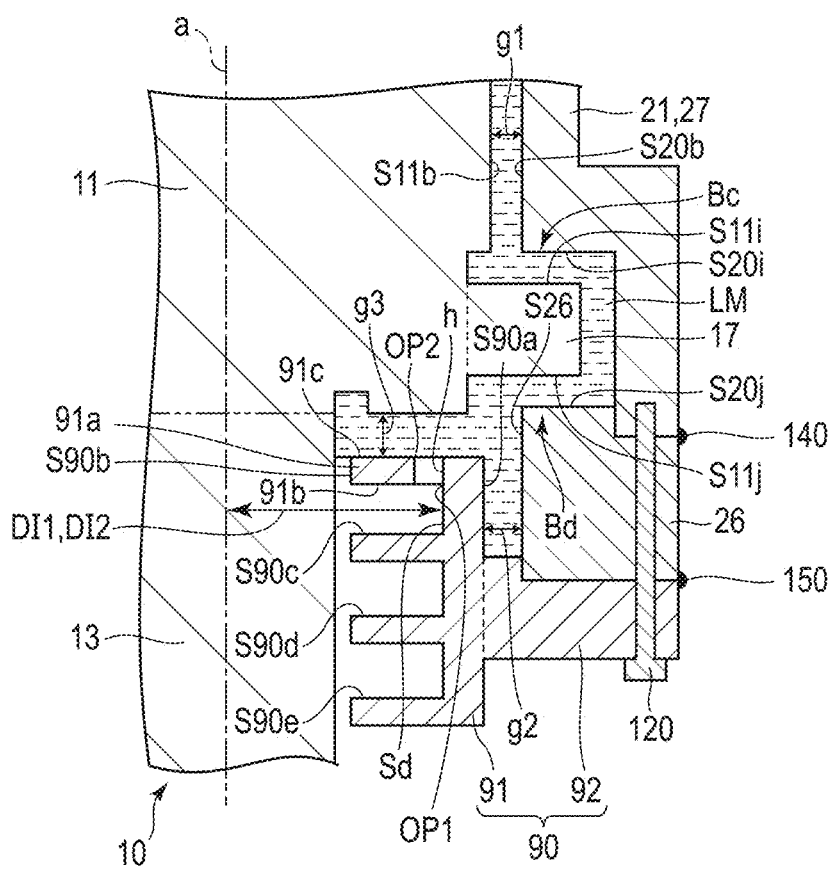
FIG. 11 is an enlarged sectional view showing part of an X-ray tube according to the second embodiment, and showing a stationary shaft and a rotating body.

Next is a description of an X-ray tube assembly according to a second embodiment. The X-ray tube 1 is configured in the same manner as that of the first embodiment, except for the configuration to be described in the second embodiment. FIG. 10 is a sectional view of the X-ray tube assembly according to the second embodiment. FIG. 11 is an enlarged sectional view showing part of the X-ray tube 1 according to the second embodiment and also showing a stationary shaft 10 and a rotating body 20. Note that the cylindrical section 25 is not shown in FIG. 11.

As shown in FIG. 10, the stationary shaft 10 further includes a flange section 17. The flange section 17 is located alongside the outer peripheral surface of the large-diameter section 11 and integrally formed with the large-diameter section 11 as one unit. In the present embodiment, the flange section 17 is formed continuously from the concave surface S11e of the large-diameter section 11. In other words, the flange section 17 and the large-diameter section 11 are formed of the same material at the same time. However, the stationary shaft 10 may be formed by preparing, for example, the flange section 17 and the large-diameter section 11, which are physically independent of each other, and fixing the flange section 17 to the large-diameter section 11.

The rotating body 20 further includes a bearing member 26. The bearing member 26 is formed in a cylindrical shape. In the direction along the rotation axis a, the flange section 17 is interposed between the bearing member 26 and the rotating main body 27 (first cylinder 21). For example, as in the second embodiment, in order to fix the position of the bearing member 26 relative to the first cylinder 21, an annular step portion may be formed on the outer peripheral side of the bearing member 26. The step portion of the bearing member 26 can be fit into the first cylinder 21.

Similarly, in order to fix the position of the sealing member 90 relative to the first cylinder 21 and the bearing member 26, an annular step portion may be formed on the outer peripheral side of a flange section 92. The step portion of the flange section 92 can be fit to the bearing member 26.

As shown in FIG. 11, the sealing member 90 and the bearing member 26 are fixed to the rotating main body 27 (first cylinder 21) using a screw 120. The first cylinder 21 and the bearing member 26 are welded at the entire boundary therebetween. Since a gap between the first cylinder 21 and the bearing member 26 can be liquid-tightly closed by a welding section 140, the liquid metal LM can be prevented from leaking through the gap between the first cylinder 21 and the bearing member 26. The bearing member 26 and the sealing member 90 are welded at the entire boundary therebetween. Since a gap between the bearing member 26 and the sealing member 90 can be liquid-tightly closed by a welding section 150, the liquid metal LM can be prevented from leaking through the gap between the bearing member 26 and the sealing member 90.

The flange section 17 has a thrust bearing surface S11i and a thrust bearing surface S11j located opposite to the thrust bearing surface S11i in the direction along the rotation axis a. The rotating main body 27 (first cylinder 21) includes a thrust bearing surface S20i opposed to the thrust bearing surface S11i of the flange section 17 in the direction along the rotation axis a. The bearing member 26 includes a thrust bearing surface S20j opposed to the thrust bearing surface S11j of the flange section 17 in the direction along the rotation axis a.

The liquid metal LM constitutes a thrust sliding bearing Bc of a dynamic pressure type, together with the thrust bearing surface S11i of the flange section 17 and the thrust bearing surface S20i of the first cylinder 21.

The liquid metal LM constitutes a thrust sliding bearing Bd of a dynamic pressure type, together with the thrust bearing surface S11j of the flange section 17 and the thrust bearing surface S20j of the bearing member 26.

In the sliding bearing unit U, the second gap g2 is a gap between the outer peripheral surface S90a of the sealing member 90 and the inner peripheral surface S26 of the bearing member 26.

The sealing member 90 includes an annular section 91a. The annular section 91a has a first end surface 91b, which is part of the capture concave surface S90c, and a second end surface 91c which is located on the opposite side of the first end surface 91b in the direction along the rotation axis a and is opposed to the large-diameter section 11. The first opening OP1 of the through hole h opens in at least one of the first end surface 91b and the bottom surface Sd. In this embodiment, the first opening OP1 opens in the first end surface 91b. The second opening OP2 of the through hole h opens in the second end surface 91c. The through hole h is formed through the sealing member 90 (annular section 91a) from the first opening OP1 to the second opening OP2.

In the present embodiment, the through hole h extends in the direction along the rotation axis a. The second distance DI2 is the same as the first distance DI1.

The through hole h connects the space surrounded by the capture concave surface S90c to the third gap g3. In this embodiment, the large-diameter section 11 and the sealing member 90 do not form a thrust sliding bearing together with the liquid metal LM. Therefore, the second opening OP2 of the through-hole h can be directly connected to the third gap g3. The third gap g3 connects the through hole h to the first gap g1 and the like.

According to the X-ray tube assembly according to the second embodiment configured as described above, the X-ray tube 1 includes a sliding bearing unit U, an anode target 50, a cathode 60, an envelope 70 and the like. The sliding bearing unit U includes a thrust sliding bearing at a position apart from the third gap g3.

The through hole h has a second opening OP2 directly connected to the third gap g3 to form a circulation path of the liquid metal LM together with the capture concave surface S90c and the like. If the liquid metal LM is captured by the capture concave surface S90c, the liquid metal LM can be used again for the bearing without adversely affecting the thrust sliding bearing.

From the above, the second embodiment can also bring about the same advantages as those of the first embodiment. The second embodiment makes it possible to provide a sliding bearing unit U capable of obtaining satisfactory bearing operation over a long period of time and an X-ray tube 1 including the sliding bearing unit.

Note that one or more techniques of the above modification 1 (FIG. 5), modification 2 (FIG. 6), modification 3 (FIG. 7), modification 4 (FIG. 8) and modification 5 (FIG. 9) can be applied to the second embodiment.

Modification 1 of Second Embodiment

Figure 12:
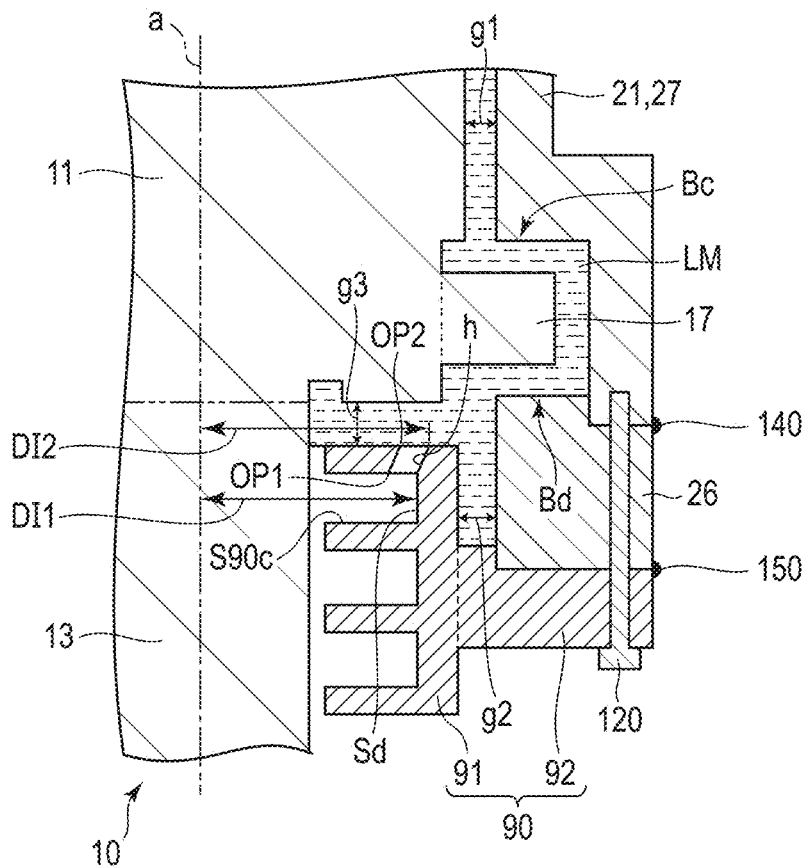
FIG. 12 is an enlarged sectional view showing part of an X-ray tube according to modification 1 of the second embodiment, and showing a stationary shaft and a rotating body.

Next is a description of modification 1 of the second embodiment. The X-ray tube 1 (sliding bearing unit U) is configured in the same manner as that of the second embodiment, except for the configuration to be described in this modification 1. FIG. 12 is an enlarged sectional view showing part of the X-ray tube 1 according to modification 1 and also showing a stationary shaft 10 and a rotating body 20.

As shown in FIG. 12, the through hole h need not extend in a direction along the rotation axis a. The second distance DI2 may exceed the first distance DI1. That is, in a direction perpendicular to the rotation axis a, the longest distance from the rotation axis a to the second opening OP2 of the through hole h may exceed the longest distance from the rotation axis a to the first opening OP1 of the through hole h. The modification 1 can bring about the same advantages as those of the second embodiment.

Third Embodiment

Figure 14:
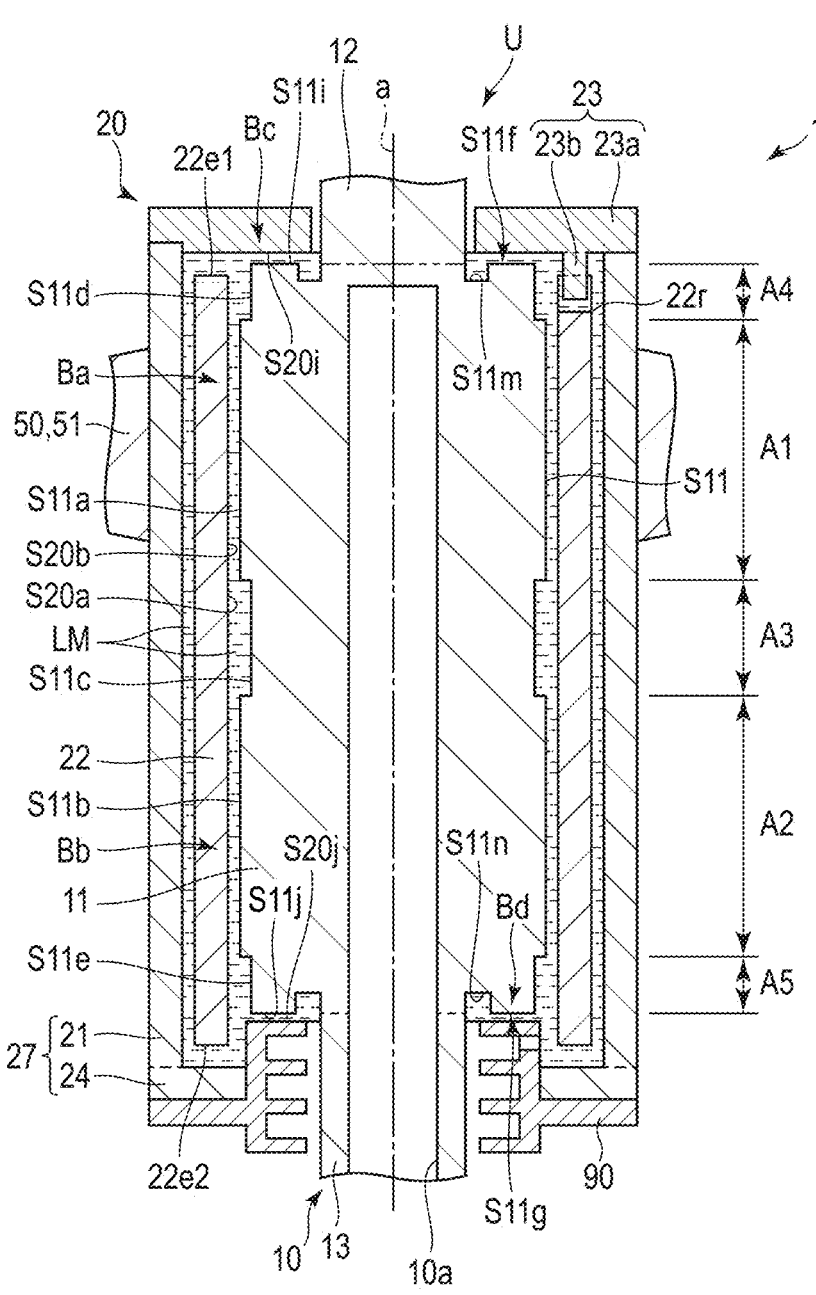
FIG. 14 is an enlarged sectional view showing part of an X-ray tube shown in FIG. 13.
Figure 15:
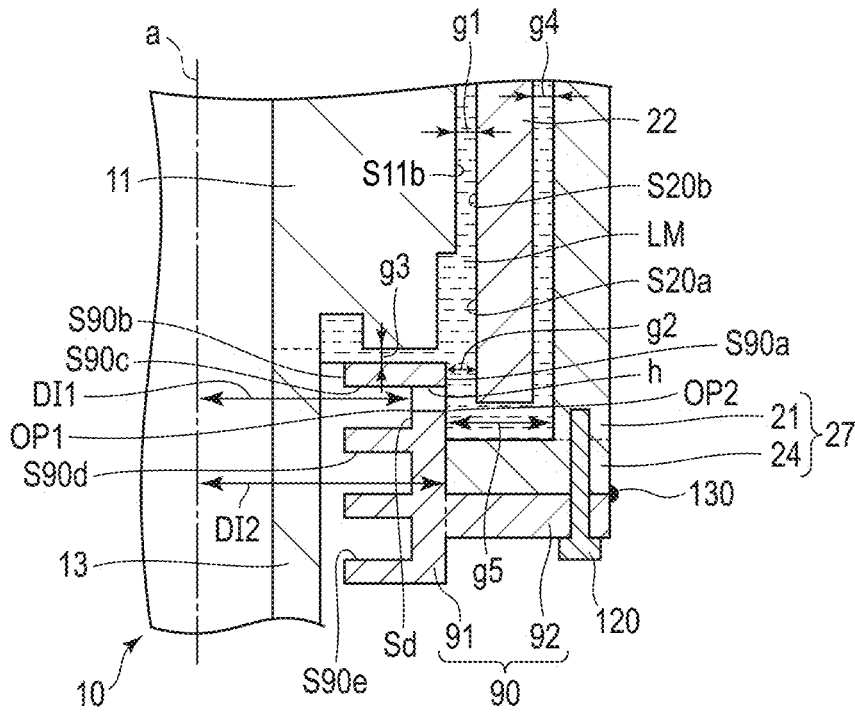
FIG. 15 is a further enlarged sectional view of the part of the X-ray tube shown in FIG. 14.
Figure 16:
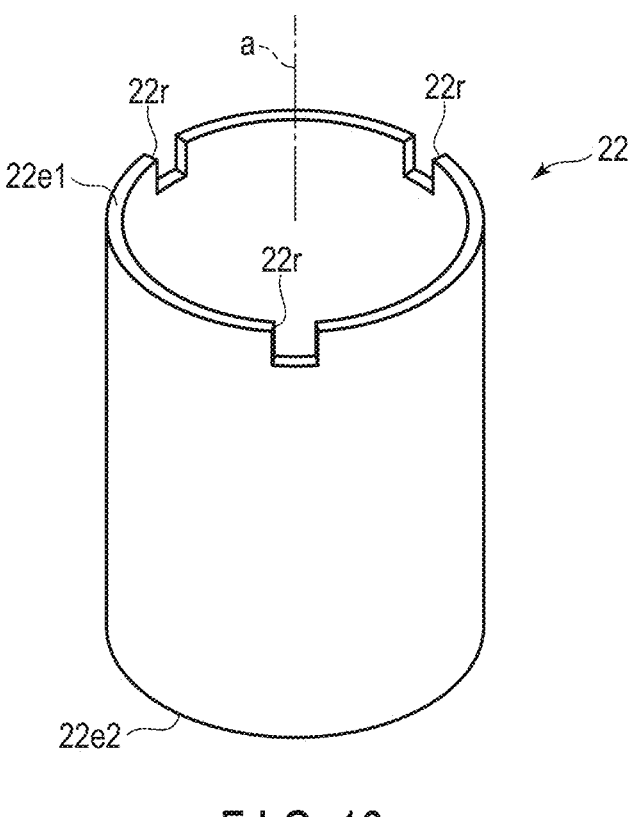
FIG. 16 is a perspective view showing a second cylinder shown in FIG. 13.
Figure 17:
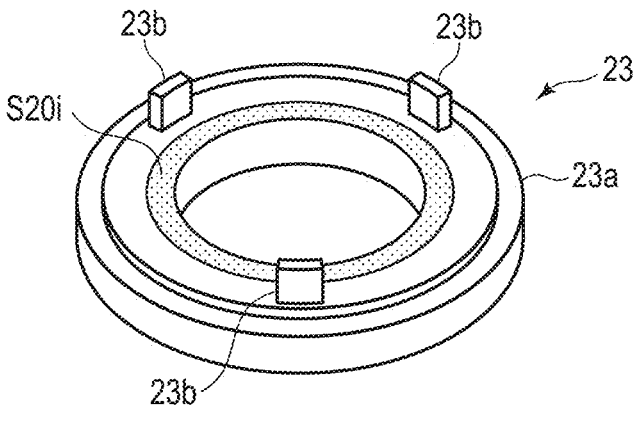
FIG. 17 is a perspective view showing a first restriction member shown in FIG. 13.

Next is a description of an X-ray tube assembly according to a third embodiment. The X-ray tube 1 is configured in the same manner as that of the first embodiment except for the configuration to be described in the third embodiment. FIG. 13 is a sectional view showing the X-ray tube assembly according to the third embodiment. FIG. 14 is an enlarged sectional view showing part of the X-ray tube 1 shown in FIG. 13. In FIG. 14, the cylindrical portion 25 is not shown. FIG. 15 is a further enlarged sectional view showing part of the X-ray tube 1 shown in FIG. 14. FIG. 16 is a perspective view of the second cylinder 22 shown in FIG. 13. FIG. 17 is a perspective view of a first restriction member 23 shown in FIG. 13.

As shown in FIGS. 13 and 14, the stationary shaft 10 further includes a small-diameter section 12. The small-diameter section 12 is formed in a columnar shape whose outer diameter is smaller than that of the large-diameter section 11 and is located alongside the other end of the large-diameter section 11. The small-diameter section 12 is located closer to the rotation axis a than the thrust bearing surface S11$i$. Note that when one end surface S11$f$ is viewed from the direction along the rotation axis a, the concave surface S11$m$ has an annular shape and is located between the thrust bearing surface S11$i$ and the small-diameter section 12.

The stationary shaft 10 includes a first bottom surface 10$b$1, a second bottom surface 10$b$2 and a heat transfer section 10$a$. The second bottom surface 10$b$2 is located on the opposite side of the first bottom surface 10$b$1 in the direction along the rotation axis a. In the present embodiment, the first bottom surface 10$b$1 is located at the small-diameter section 12, and the second bottom surface 10$b$2 is located at the small-diameter section 13.

The heat transfer section 10$a$ extends along the rotation axis a and opens in at least one of the first and second bottom surfaces 10$b$1 and 10$b$2. In the present embodiment, the heat transfer section 10$a$ is a heat transfer hole, which opens in the second bottom surface 10$b$2 and does not open in the first bottom surface 10$b$1. The heat transfer section 10$a$ forms a flow path for cooling fluid. The heat transfer section 10$a$ transfers heat to the cooling fluid flowing inside by forced convection. In the present embodiment, the cooling fluid is coolant L. The cooling rate of the anode target 50 of the X-ray tube 1 can be improved by water cooling or oil cooling. However, the cooling fluid may be air, and air cooling may improve the cooling rate of the anode target 50.

Preferably, the heat transfer section 10$a$ is located at least in the area A1. It is thus possible to cool a part of the stationary shaft 10 to which the heat of the anode target 50 is easily transmitted. Note that the area A1 is surrounded by the anode target 50.

The rotating body 20 includes a first cylinder 21, a second cylinder 22, a first restriction member 23, a second restriction member 24, a cylindrical section 25 and a sealing member 90. The first cylinder 21, the second cylinder 22, the first restriction member 23 and the second restriction member 24 are each formed of metal such as a Fe alloy and a Mo alloy. In the rotating body 20, the first cylinder 21 is an outer cylinder located outside, and the second cylinder 22 is an inner cylinder located relatively inside.

As shown in FIGS. 13 to 16, the first cylinder 21 is formed in a cylindrical shape extending along the rotation axis a and is located around the large-diameter section 11. The second cylinder 22 extends along the rotation axis a and is formed in a cylindrical shape. The second cylinder 22 is located between the large-diameter section 11 of the stationary shaft 10 and the first cylinder 21. In the present embodiment, the second cylinder 22 has uniform inner and outer diameters throughout its entire length. The inner diameter of the second cylinder 22 is larger than the outer diameter (outer diameter DO3) of the stationary shaft 10 (larger-diameter section 11), and the outer diameter of the second cylinder 22 is smaller than the inner diameter of the first cylinder 21.

The first cylinder 21 does not include the radial bearing surface S20$b$. The second cylinder 22 has an inner peripheral surface S20$a$ including the radial bearing surface S20$b$. The radial bearing surface S20$b$ is located at least in the areas A1 and A2. In the present embodiment, the radial bearing surface S20$b$ is a smooth inner peripheral surface and a plain surface. For the gap between the second cylinder 22 and the stationary shaft 10 and the gap between the second cylinder 22 and the first cylinder 21, the second cylinder 22 can be moved to a location eccentric to each of the stationary shaft 10 and the first cylinder 21. The rotating operation of the second cylinder 22 is restricted so as not to rotate relatively to the first cylinder 21. Thus, the rotational speed of the second cylinder 22 is the same as that of the first cylinder 21.

The length of the second cylinder 22 in the direction along the rotation axis a is adjusted so as not to impair the function of each of the radial sliding bearings and the thrust sliding bearings.

The second cylinder 22 includes a first end surface 22$e$1, a second end surface 22$e$2 and one or more recesses 22$r$. The first end surface 22$e$1 is located at the end of the second cylinder 22 in the direction along the rotation axis a. The second end surface 22$e$2 is located at the end of the second cylinder 22 in the direction along the rotation axis a and is located on the opposite side of the first end surface 22$e$1. In the present embodiment, the second cylinder 22 includes three recesses 22$r$. These recesses 22$r$ are spaced from each other in the circumferential direction. Each of the recesses 22$r$ opens in the first end surface 22$e$1 and is recessed in the direction along the rotation axis a.

In the present embodiment, a gap between the first and second cylinders 21 and 22 is 10 μm to 40 μm in the direction perpendicular to the rotation axis a.

As shown in FIGS. 13, 14, and 17, the first restriction member 23 includes a first member 23$a$ and one or more second members 23$b$. In the present embodiment, the first restriction member 23 includes three second members 23$b$. The first member 23$a$ has an annular shape and is fixed to the first cylinder 21. For example, in order to fix the position of the first member 23$a$ relative to the first cylinder 21 as in the present embodiment, an annular step portion may be formed on the outer peripheral side of the first member 23a. The step portion of the first member 23a can be fit to the first cylinder 21.

By holding the first member 23a pressed against the first cylinder 21 in the direction along the rotation axis a, the first member 23a can be fixed to the first cylinder 21. Alternatively, the first member 23a may be fixed to the first cylinder 21 by welding or brazing or it may be removably fixed thereto using screws.

The first member 23a is opposed to the first end surface 22e1 of the second cylinder 22. Thus, the first member 23a can restrict the movement of the second cylinder 22 in the direction along the rotation axis a. The first member 23a includes a thrust bearing surface S20i opposed to the thrust bearing surface S11i of the stationary shaft 10 in the direction along the rotation axis a. The thrust bearing surface S20i is located on the inner peripheral side of the first member 23a and has an annular shape. In FIG. 17, a dot pattern is attached to the thrust bearing surface S20i.

Each of the second members 23b projects from the first member 23a toward a direction along the rotation axis a. The second members 23b are provided in one-to-one correspondence with the recesses 22r of the second cylinder 22. Each of the second members 23b is fit into corresponding recess 22r of the second cylinder 22. In the present embodiment, a sufficient gap for fitting is secured between the second members 23b and the recesses 22r. Therefore, the second member 23b can be fitted into the recess 22r without using a tightening fit. In addition, the gap between the second member 23b and the recess 22r can be used as a circulation path for the liquid metal LM.

The second member 23b is configured to restrict the rotating operation of the second cylinder 22 together with the recesses 22r of the second cylinder 22. The second cylinder 22 is restricted so as not to rotate with respect to the first cylinder 21.

The gap (clearance) between the first restriction member 23 (first member 23a) and the stationary shaft 10 (small-diameter section 12) is set to a value capable of maintaining operation of the rotating body 20 and suppressing leakage of the liquid metal LM. From the above, the gap is slight, and the first member 23a functions as a labyrinth seal ring.

As shown in FIGS. 13 to 15, the second restriction member 24 has an annular shape and is fixed to the first cylinder 21. In the present embodiment, the second restriction member 24 is formed of the same material as the first cylinder 21 and integrally formed therewith as one unit. The second restriction member 24 is opposed to the second end surface 22e2 of the second cylinder 22. Thus, the second restriction member 24 can restrict the movement of the second cylinder 22 in the direction along the rotation axis a. The second restriction member 24 and the first cylinder 21 function as a rotating main body 27.

The sealing member 90 is fixed to the rotating main body 27 using screws 120. The sealing member 90 has only to be indirectly fixed to at least the first cylinder 21. The rotating main body 27 (second restriction member 24) and the sealing member 90 are welded at the entire boundary therebetween. Since the gap between the second restriction member 24 and the sealing member 90 can be liquid-tightly closed by the welding section 130, the liquid metal LM can be prevented from leaking through the gap between the second restriction member 24 and the sealing member 90.

When the sliding bearing unit U is assembled, a second cylinder 22 is inserted into the rotating main body 27 that is an integral object of the first cylinder 21 and the second restriction member 24, and then the stationary shaft 10 is fit into the second cylinder 22. After that, the first restriction member 23 is fixed to the first cylinder 21 in order to cover it with the first restriction member 23. Then, the sealing member 90 is fixed to the rotating main body 27.

In the present embodiment, the second restriction member 24 is integrally formed with the first cylinder 21 as one unit, and the first restriction member 23 is physically independent of the first cylinder 21.

However, the first restriction member 23 may be integrally formed with the first cylinder 21 as one unit, and the second restriction member 24 may be physically independent of the first cylinder 21.

Alternatively, each of the first and second restriction members 23 and 24 may be physically independent of the first cylinder 21.

The stationary shaft 10 and the rotating body 20 are spaced from each other in a totally opposed area. The large-diameter section 11 is covered with the rotating body 20. The small-diameter sections 12 and 13 protrudes to the outside of the rotating body 20. The stationary shaft 10 rotatably supports the rotating body 20.

The liquid metal LM is filled in a plurality of gaps between the stationary shaft 10 (large-diameter section 11), the first cylinder 21, the second cylinder 22, the first restriction member 23, the second restriction member 24 and the sealing member 90.

The gap between the first end surface 22e1 (recess 22r) of the second cylinder 22 and the first restriction member 23 is connected to the gap between the stationary shaft 10 and the second cylinder 22 and the gap between the first cylinder 21 and the second cylinder 22, thereby constituting a circulation path for the liquid metal LM.

The gap between the second end surface 22e2 of the second cylinder 22 and the second restriction member 24 is connected to the gap between the stationary shaft 10 and the second cylinder 22 and the gap between the first cylinder 21 and the second cylinder 22, thereby constituting a circulation path for the liquid metal LM.

As described above, the liquid metal LM can move through a plurality of gaps between the stationary shaft 10 (large-diameter section 11), the first cylinder 21, the second cylinder 22, the first restriction member 23, the second restriction member 24 and the sealing member 90.

Here is a description of the materials of the stationary shaft 10, the first cylinder 21, the second cylinder 22 and the anode target main body 51.

The degree of freedom in selecting the materials of the first and second cylinders 21 and 22 is high. Therefore, the second cylinder 22 may be formed of the same material as that of the first cylinder 21 or of a material other than that the first cylinder 21.

The second cylinder 22 may be formed of the same material as that of the stationary shaft 10. The thermal expansion coefficient of the second cylinder 22 can be matched with the thermal expansion coefficient of the stationary shaft 10. For example, it is possible to reduce a gap between the radial bearings from varying.

The first cylinder 21 may be formed of the same material as that of the stationary shaft 10. The thermal expansion coefficient of the first cylinder 21 can be matched with the thermal expansion coefficient of the stationary shaft 10. For example, it is possible to reduce a gap between the thrust bearings from varying.

Note that the stationary shaft 10 may be formed of a material other than that of the first cylinder 21 or a material other than that of the second cylinder 22. For example, the stationary shaft 10 may be formed of a metal that is softer than the first cylinder 21 or the stationary shaft 10 may be formed of a metal that is softer than the second cylinder 22. Since the stationary shaft 10 can easily be machined, its productivity can be improved.

If the anode target main body 51 is spaced from the outer peripheral surface of the first cylinder 21, the first cylinder 21 may be formed of the same material as that of the anode target main body 51 or a material other than that of the anode target main body 51.

If the anode target main body 51 is connected to the outer peripheral surface of the first cylinder 21 and is fixed to the outer peripheral surface of the first cylinder 21, the first cylinder 21 is formed of the same material as that of the anode target main body 51. The thermal expansion coefficient of the anode target main body 51 can be matched with the thermal expansion coefficient of the first cylinder 21. For example, it is possible to reduce the anode target main body 51 from being detached from the first cylinder 21 and reduce at least one of the first cylinder 21 and the anode target main body 51 from being damaged.

The envelope 70 further includes an opening 71. To maintain the airtight state of the envelope 70, the opening 71 is vacuum-tightly bonded to the small-diameter section 12 of the stationary shaft 10. In the present embodiment, the X-ray tube 1 employs a double-sided support structure for the bearings. The envelope 70 fixes the small-diameter sections 12 and 13 of the stationary shaft 10. That is, the small-diameter sections 12 and 13 function as double-sided support sections for the bearings.

The X-ray tube 1 includes a tube section 40, which is provided at the interior of the stationary shaft 10. The annular section 16 is liquid-tightly bonded to the second bottom surface 10*b*2 of the stationary shaft 10. The outer peripheral surface of the tube section 40 is liquid-tightly bonded to the opening of the annular section 16 and extends to the outside of the stationary shaft 10. The stationary shaft 10 forms a flow path of coolant L together with the tube section 40.

The tube section 40 includes an inlet 40*a* that takes in the coolant L and a discharge port 40*b* that discharges the coolant L to the inside of the stationary shaft 10. The inlet 40*a* is located on the side extending outward from the second bottom surface 10*b*2 of the stationary shaft 10. The discharge port 40*b* is located with a gap on the bottom surface of the heat transfer section (heat transfer hole) 10*a* in the direction along the rotation axis a.

On the outside of the envelope 70, an opening is formed in the stationary shaft 10, and a tube section 45 is liquid-tightly bonded to the opening. The tube section 45 includes an outlet 45*a* for taking out the coolant L to the outside. Accordingly, the coolant L, which circulates inside the X-ray tube 1, is taken in from the inlet 40*a*, passes through the inside of the tube section 40, is discharged from the discharge port 40*b* to the inside of the stationary shaft 10, passes between the tube section 40 and the stationary shaft 10, and is taken out from the outlet 45*a* of the tube section 45. Note that the coolant L may be circulated in the reverse direction. In this case, the tube section 45 forms an inlet port of the coolant L, and the tube section 40 forms an outlet of the coolant L.

Figures 18, 19:
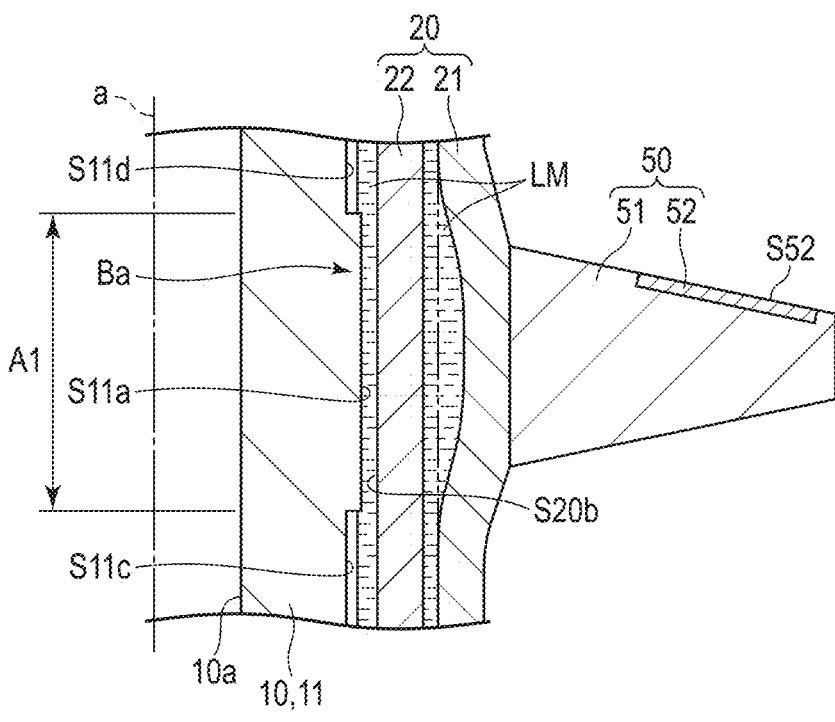
FIG. 18 is an enlarged sectional view showing part of the X-ray tube according to the third embodiment, and showing a state from when heat is input to an anode target until when the anode target is cooled.
FIG. 19 is an enlarged sectional view showing part of an X-ray tube according to modification 1 of the third embodiment, and showing a stationary shaft and a rotating body.

FIG. 18 is an enlarged sectional view showing part of the X-ray tube 1 according to the present embodiment and showing a state from when heat is supplied to the anode target 50 until when the anode target 50 is cooled.

As shown in FIG. 18, when the anode target 50 generates heat, it thermally expands. Then, the thermal expansion propagates stress to a portion integrated with the anode target 50 or firmly bonded to the anode target 50 to cause thermal deformation. In the present embodiment, thermal deformation is likely to occur in the portion of the first cylinder 21 that is located in the area A1. For example, the portion may be extended outward in a radial direction by up to 100 μm.

In the present embodiment, however, the second cylinder 22 is not physically fixed to the first cylinder 21. The second cylinder 22 is spaced from the first cylinder 21. Since the second cylinder 22 is not tightly bonded to the first cylinder 21, stress due to deformation of the first cylinder 21 is difficult to propagate to the second cylinder 22. It is possible to reduce deformation of the second cylinder 22 caused by the thermal expansion of the anode target 50 and reduce bearing performance from decreasing.

The volume between the first and second cylinders 21 and 22 increases. Thus, the liquid metal LM gathers toward the first cylinder 21 by centrifugal force to generate a vacuum space alongside the large-diameter section 11. Since, however, a reservoir space of the liquid metal LM is formed in advance by the concave surfaces S11*c*, S11*d* and S11*e*, the liquid metal LM can be supplied to a gap between the first and second cylinders 21 and 22 and a bearing gap. From the above, too, the bearing performance can be reduced from decreasing. In addition, heat transfer from the anode target 50 toward the large-diameter section 11 is not inhibited.

Unlike in the present embodiment, the second member 23*b* may be fit into the recess 22*r* using a tightening fit. In this case, too, the deformation of the second cylinder 22 caused by the thermal expansion of the anode target 50 can be reduced. This is because the end portion of the first cylinder 21 is difficult to deform even though the anode target 50 is thermally expanded and the second cylinder 22 is indirectly fixed to the end portion of the first cylinder 21 that is difficult to deform.

The position of the second cylinder 22 relative to the first cylinder 21 may be fixed by the tightening fit as described above. In this case, the second cylinder 22 cannot be moved to a position eccentric to the first cylinder 21. Note that the method for fixing the position of the second cylinder 22 relative to that of the first cylinder 21 is not restricted to the tightening fit, but may be executed by brazing, welding, or using screws.

In the present embodiment, an end portion of the second cylinder 22 alongside the first end surface 22*e*1 is indirectly fixed to the first cylinder 21 through the first restriction member 23.

However, in order to fix the position of the second cylinder 22 relative to the first cylinder 21, the end portion of the second cylinder 22 alongside of the first end surface 22*e*1 need not be fixed. The end portion of the second cylinder 22 alongside the second end surface 22*e*2 may be indirectly fixed to the first cylinder 21 through the second restriction member 24. Since the heat transfer path from the anode target 50 is longer alongside the second end surface 22*e*2 than alongside the first end surface 22*e*1, the deformation of the second cylinder 22 can be further reduce.

Alternatively, the end portion of the second cylinder 22 alongside the first end surface 22*e*1 may be indirectly fixed to the first cylinder 21 through the first restriction member 23, and the end portion of the second cylinder 22 alongside the second end surface 22*e*2 may be indirectly fixed to the first cylinder 21 through the second restriction member 24.

Here is a description of the dimensions of the stationary shaft 10 and the sealing member 90.

As shown in FIGS. 3 and 15, the second distance DI2 is equal to or longer than the first distance DI1. In the present embodiment, the second distance DI2 exceeds the first distance DI1. The third distance DI3 is equal to or longer than the first distance DI1. In the present embodiment, the third distance DI3 exceeds the first distance DI1. In addition, the third distance DI3 is equal to or longer than the second distance DI2. In the present embodiment, the third distance DI3 exceeds the second distance DI2.

Assume here that in the sliding bearing unit U, a gap between the inner peripheral surface of the first cylinder 21 and the outer peripheral surface of the second cylinder 22 is a fourth gap g4 and a gap between the inner peripheral surface of the first cylinder 21 and the outer peripheral surface S90a of the sealing member 90 is a fifth gap g5. The second gap g2 connects the through hole h to the first gap g1. The fifth gap g5 connects the through hole h to the fourth gap g4.

According to the X-ray tube assembly of the third embodiment configured as described above, the X-ray tube assembly includes a rotating anode X-ray tube 1. The X-ray tube 1 includes a sliding bearing unit U, and the sliding bearing unit U includes a sealing member 90. The sealing member 90 of the present embodiment is formed in the same manner as the sealing member 90 of the first embodiment. Therefore, the present embodiment can bring about the same advantages as those of the first embodiment.

The rotating body 20 includes a first cylinder 21 and a second cylinder 22. The first cylinder 21 is formed in a cylindrical shape extending along the rotation axis a and is located around the stationary shaft 10. The second cylinder 22 extends along the rotation axis a to be formed in a cylindrical shape, and is located between the stationary shaft 10 and the first cylinder 21. The second cylinder 22 has a radial bearing surface S20b in its inner peripheral surface S20a, and its rotating operation is limited such that it does not rotate relatively to the first cylinder 21. The second cylinder 22 may be movable to an eccentric position relative to each of the stationary shaft 10 and the first cylinder 21.

The liquid metal LM is filled in a plurality of gaps between the stationary shaft 10, the first cylinder 21 and the second cylinder 22 to form a radial sliding bearing Ba of a dynamic pressure type together with the radial bearing surfaces S11a and S20b and form a radial sliding bearing Bb of a dynamic pressure type together with the radial bearing surfaces S11b and S20b. The anode target 50 surrounds the outer peripheral surface of the first cylinder 21 and is fixed to the first cylinder 21.

The rotating body 20 has a double cylindrical structure. The first cylinder 21, which is tightly bonded to the anode target 50 or integrally formed with the anode target 50, and the second cylinder 22 that forms the radial sliding bearings Ba and Bb are physically independent of each other. The second cylinder 22 is less susceptible to the adverse effects of thermal expansion of the anode target 50. The present embodiment can provide a sliding bearing unit U capable of obtaining a satisfactory bearing operation and an X-ray tube 1 provided with the sliding bearing unit U.

Note that one or more techniques of the above modification 1 (FIG. 5), modification 2 (FIG. 6), modification 3 (FIG. 7), modification 4 (FIG. 8) and modification 5 (FIG. 9) can be applied to the third embodiment.

Modification 1 of Third Embodiment

Next is a description of modification 1 of the third embodiment. The X-ray tube 1 (sliding bearing unit U) is configured in the same manner as the third embodiment except for the configuration described in this modification 1.

FIG. 19 is an enlarged sectional view showing part of the X-ray tube 1 according to modification 1 and showing a stationary shaft 10 and a rotating body 20.

As shown in FIG. 19, the rotating body 20 may be formed without the second restriction member 24. The sealing member 90 is fixed to the first cylinder 21 using screws 120. The sealing member 90 is opposed to the second end surface 22e2 of the second cylinder 22. Thus, the sealing member 90 can restricted the movement of the second cylinder 22 in the direction along the rotation axis a.

In a direction perpendicular to the rotation axis a, the sealing member 90 is opposed to the first cylinder 21, not to the second cylinder 22. Assume that in the sliding bearing unit U, a gap between the second end surface 22e2 of the second cylinder 22 and the second end surface 91c of the sealing member 90 is a sixth gap g6. The fifth gap g5 connects the through hole h to the fourth gap g4. In addition, the fifth gap g5 connects the through hole h to the first gap g1 through the sixth gap g6.

As shown in FIGS. 3 and 19, the third distance DI3 is equal to or longer than the first distance DI1. In this modification 1, the third distance DI3 exceeds the first distance DI1. This modification 1 can bring about the same advantages as those of the third embodiment.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the large-diameter section 11 may be formed without the concave surface S11d that is called an inlet region, in which case the radial bearing surface S11a may extend to the end of the large-diameter section 11. The large-diameter section 11 may be formed without a concave surface S11e that is called an inlet region, in which case the radial bearing surface S11b may extend to the end of the large-diameter section 11.

The through hole h opens in the capture concave surface S90c closest to the large-diameter section 11, but may open in a capture concave surface other than the capture concave surface S90c. For example, the through hole h may open in the capture concave surface S90d. Alternatively, the sealing member 90 may include both a through hole h that opens in the capture concave surface S90c and a through hole h that opens in the capture concave surface S90d.

Inventions according to the above-explained embodiments and modifications will be additionally described below.

(1) A sliding bearing unit comprising:
a stationary shaft extending along a rotation axis and including a large-diameter section having a first radial bearing surface on a first outer peripheral surface and a small-diameter section integrally formed with the large-diameter section as one unit and having a second outer diameter that is smaller than a first outer diameter of the large-diameter section;
a rotating body that is rotatable around the stationary shaft; and
a lubricant, wherein the rotating body includes a rotating main body extending along the rotation axis to be formed in a cylindrical shape, located around the large-diameter section, and having a second radial bearing surface on a first inner peripheral surface, and a sealing member fixed to the rotating main body, formed in a cylindrical shape, located around the small-diameter section, and having a second outer peripheral surface, a second inner peripheral surface, a capture concave surface that opens in the second inner peripheral surface and is recessed toward the second outer peripheral surface to capture the lubricant, and a through hole, the lubricant is filled in a gap between the stationary shaft and the rotating body, and forms a radial sliding bearing of a dynamic pressure type together with the first radial bearing surface and the second radial bearing surface, and the through hole has a first opening that opens in the capture concave surface and a second opening that opens in a surface other than the second inner peripheral surface and the capture concave surface of the sealing member, is formed through the sealing member from the first opening to the second opening, and connects a space surrounded by the capture concave surface to a first gap between the first radial bearing surface and the second radial bearing surface.

(2) The sliding bearing unit of (1), wherein assuming in a direction perpendicular to the rotation axis, a longest distance from the rotation axis to the first opening is set as a first distance and a longest distance from the rotation axis to the second opening is set as a second distance, the second distance is equal to or longer than the first distance.

(3) The sliding bearing unit of (2), wherein a second gap is formed between the first inner peripheral surface and the second outer peripheral surface, the capture concave surface includes a bottom surface located alongside the second outer peripheral surface, the first opening opens in the bottom surface of the capture concave surface, the second opening opens in the second outer peripheral surface, and the second gap connects the through hole to the first gap.

(4) The sliding bearing unit of (3), wherein the large-diameter section includes a first thrust bearing surface opposed to the sealing member, the sealing member includes a second thrust bearing surface opposed to the first thrust bearing surface, and the lubricant forms a thrust sliding bearing of a dynamic pressure type together with the first thrust bearing surface and the second thrust bearing surface.

(5) The sliding bearing unit of (2), wherein the first radial bearing surface has a smooth plain surface and a plurality of raking concave surfaces each of which is opened in the plain surface and recessed toward the rotation axis to rake the lubricant, the plurality of raking concave surfaces each includes a bottom surface located alongside the rotation axis, and assuming in a direction perpendicular to the rotation axis, a distance from the rotation axis to the bottom surface of each of the plurality of raking concave surfaces is set as a third distance, the third distance is equal to or longer than the second distance.

(6) The sliding bearing unit of (2), wherein the first radial bearing surface has a smooth plain surface and a plurality of raking concave surfaces each of which is opened in the plain surface and recessed toward the rotation axis to rake the lubricant, the plurality of raking concave surfaces each includes a bottom surface located alongside the rotation axis, and assuming in a direction perpendicular to the rotation axis, a distance from the rotation axis to the bottom surface of each of the plurality of raking concave surfaces is set as a third distance, the third distance is shorter than the second distance.

(7) The sliding bearing unit of (2), wherein a second gap is formed between the first inner peripheral surface and the second outer peripheral surface, the sealing member further has a reservoir concave surface which is opened in the second outer peripheral surface and recessed toward the second inner peripheral surface to store the lubricant, the capture concave surface includes a bottom surface located alongside the second outer peripheral surface, the first opening opens in the bottom surface of the capture concave surface, the second opening opens in the reservoir concave surface, and the reservoir concave surface and the second gap connect the through hole to the first gap.

(8) The sliding bearing unit of (2), wherein the stationary shaft further includes a flange section which is located alongside the first outer peripheral surface and integrally formed with the large-diameter section as one unit, the flange section includes a first thrust bearing surface and a third thrust bearing surface located opposite to the first thrust bearing surface in a direction along the rotation axis, the rotating body has a second thrust bearing surface opposed to the first thrust bearing surface and a fourth thrust bearing surface opposed to the third thrust bearing surface, the lubricant forms a first thrust sliding bearing of a dynamic pressure type together with the first thrust bearing surface and the second thrust bearing surface, the lubricant forms a second thrust sliding bearing of a dynamic pressure type together with the third thrust bearing surface and the fourth thrust bearing surface, a third gap is formed between the large-diameter section and the sealing member in a direction along the rotation axis, the capture concave surface includes a bottom surface located alongside the second outer peripheral surface, the sealing member includes an annular section having a first end surface that is part of the capture concave surface and a second end surface which is located opposite to the first end surface in the direction along the rotation axis and opposed to the large-diameter section, the first opening opens in at least one of the first end surface and the bottom surface of the capture concave surface, the second opening opens in the second end surface, and the third gap connects the through hole to the first gap.

(9) The sliding bearing unit of (2), wherein the rotating main body includes a first cylinder extending along the rotation axis to be formed in a cylindrical shape, and located around the large-diameter section, and a second cylinder extending along the rotation axis to be formed in a cylindrical shape, located between the large-diameter section and the first cylinder, having the first inner peripheral surface including the second radial bearing surface, and having a rotation operation restricted so as not to rotate relative to the first cylinder, the sealing member is fixed to the first cylinder, and the lubricant is filled in a plurality of gaps between the stationary shaft, the first cylinder and the second cylinder.

(10) The sliding bearing unit of (2), wherein the first radial bearing surface has a smooth plain surface and a plurality of raking concave surfaces each of which is opened in the plain surface and recessed toward the rotation axis to rake the lubricant, the plurality of raking concave surfaces each includes a bottom surface located alongside the rotation axis, and assuming in a direction perpendicular to the rotation axis, a distance from the rotation axis to the bottom surface of each of the plurality of raking concave surfaces is set as a third distance, the third distance is equal to or longer than the first distance.

(11) A rotating anode X-ray tube comprising:

a sliding bearing unit including a stationary shaft extending along a rotation axis and including a large-diameter section having a first radial bearing surface on a first outer peripheral surface and a small-diameter section integrally formed with the large-diameter section as one unit and having a second outer diameter that is smaller than a first outer diameter of the large-diameter section, a rotating body that is rotatable around the stationary shaft, and a lubricant;

an anode target fixed to the rotating body;

a cathode opposed to the anode target; and an envelope which houses the sliding bearing unit, the anode target and the cathode and which fixes the stationary shaft, wherein the rotating body includes a rotating main body extending along the rotation axis to be formed in a cylindrical shape, located around the large-diameter section, and having a second radial bearing surface on a first inner peripheral surface, and a sealing member fixed to the rotating main body, formed in a cylindrical shape, located around the small-diameter section, and having a second outer peripheral surface, a second inner peripheral surface, a capture concave surface that opens in the second inner peripheral surface and is recessed toward the second outer peripheral surface to capture the lubricant, and a through hole, the lubricant is filled in a gap between the stationary shaft and the rotating body, and forms a radial sliding bearing of a dynamic pressure type together with the first radial bearing surface and the second radial bearing surface, and the through hole has a first opening that opens in the capture concave surface and a second opening that opens in a surface other than the second inner peripheral surface and the capture concave surface of the sealing member, is formed through the sealing member from the first opening to the second opening, and connects a space surrounded by the capture concave surface to a first gap between the first radial bearing surface and the second radial bearing surface.

(12) The rotating anode X-ray tube of (11), wherein assuming in a direction perpendicular to the rotation axis, a longest distance from the rotation axis to the first opening is set as a first distance and a longest distance from the rotation axis to the second opening is set as a second distance, the second distance is equal to or longer than the first distance.

(13) The rotating anode X-ray tube of (12), wherein a second gap is formed between the first inner peripheral surface and the second outer peripheral surface, the capture concave surface includes a bottom surface located alongside the second outer peripheral surface, the first opening opens in the bottom surface of the capture concave surface, the second opening opens in the second outer peripheral surface, and the second gap connects the through hole to the first gap.

(14) The rotating anode X-ray tube of (13), wherein the large-diameter section includes a first thrust bearing surface opposed to the sealing member, the sealing member includes a second thrust bearing surface opposed to the first thrust bearing surface, and the lubricant forms a thrust sliding bearing of a dynamic pressure type together with the first thrust bearing surface and the second thrust bearing surface.

(15) The rotating anode X-ray tube of (12), wherein the first radial bearing surface has a smooth plain surface and a plurality of raking concave surfaces each of which is opened in the plain surface and recessed toward the rotation axis to rake the lubricant, the plurality of raking concave surfaces each includes a bottom surface located alongside the rotation axis and assuming in a direction perpendicular to the rotation axis, a distance from the rotation axis to the bottom surface of each of the plurality of raking concave surfaces is set as a third distance, the third distance is equal to or longer than the second distance.

(16) The rotating anode X-ray tube of (12), wherein the first radial bearing surface has a smooth plain surface and a plurality of raking concave surfaces each of which is opened in the plain surface and recessed toward the rotation axis to rake the lubricant, the plurality of raking concave surfaces each includes a bottom surface located alongside the rotation axis, and assuming in a direction perpendicular to the rotation axis, a distance from the rotation axis to the bottom surface of each of the plurality of raking concave surfaces is set as a third distance, the third distance is shorter than the second distance.

(17) The rotating anode X-ray tube of (12), wherein a second gap is formed between the first inner peripheral surface and the second outer peripheral surface, the sealing member further has a reservoir concave surface which is opened in the second outer peripheral surface and recessed toward the second inner peripheral surface to store the lubricant, the capture concave surface includes a bottom surface located alongside the second outer peripheral surface, the first opening opens in the bottom surface of the capture concave surface, the second opening opens in the reservoir concave surface, and the reservoir concave surface and the second gap connect the through hole to the first gap.

(18) The rotating anode X-ray tube of (12), wherein the stationary shaft further includes a flange section which is located alongside the first outer peripheral surface and integrally formed with the large-diameter section as one unit, the flange section includes a first thrust bearing surface and a third thrust bearing surface located opposite to the first thrust bearing surface in a direction along the rotation axis, the rotating body has a second thrust bearing surface opposed to the first thrust bearing surface and a fourth thrust bearing surface opposed to the third thrust bearing surface, the lubricant forms a first thrust sliding bearing of a dynamic pressure type together with the first thrust bearing surface and the second thrust bearing surface, the lubricant forms a second thrust sliding bearing of a dynamic pressure type together with the third thrust bearing surface and the fourth thrust bearing surface, a third gap is formed between the large-diameter section and the sealing member in a direction along the rotation axis, the capture concave surface includes a bottom surface located alongside the second outer peripheral surface, the sealing member includes an annular section having a first end surface that is part of the capture concave surface and a second end surface which is located opposite to the first end surface in the direction along the rotation axis and opposed to the large-diameter section, the first opening opens in at least one of the first end surface and the bottom surface of the capture concave surface, the second opening opens in the second end surface, and the third gap connects the through hole to the first gap.

(19) The rotating anode X-ray tube of (12), wherein the rotating main body includes a first cylinder extending along the rotation axis to be formed in a cylindrical shape, and located around the large-diameter section, and a second cylinder extending along the rotation axis to be formed in a cylindrical shape, located between the large-diameter section and the first cylinder, having the first inner peripheral surface including the second radial bearing surface, and having a rotation operation restricted so as not to rotate relative to the first cylinder, the sealing member is fixed to the first cylinder, and the lubricant is filled in a plurality of gaps between the stationary shaft, the first cylinder and the second cylinder.

(20) The rotating anode X-ray tube of (12), wherein the first radial bearing surface has a smooth plain surface and a plurality of raking concave surfaces each of which is opened in the plain surface and recessed toward the rotation axis to rake the lubricant, the plurality of raking concave surfaces each includes a bottom surface located alongside the rotation axis, and assuming in a direction perpendicular to the rotation axis, a distance from the rotation axis to the bottom surface of each of the plurality of raking concave surfaces is set as a third distance, the third distance is equal to or longer than the first distance.

What is claimed is:

1. A sliding bearing unit comprising:

a stationary shaft extending along a rotation axis and including a large-diameter section having a first radial bearing surface on a first outer peripheral surface and a small-diameter section integrally formed with the large-diameter section as one unit and having a second outer diameter that is smaller than a first outer diameter of the large-diameter section;

a rotating body that is rotatable around the stationary shaft; and a lubricant, wherein the rotating body includes a rotating main body extending along the rotation axis to be formed in a cylindrical shape, located around the large-diameter section, and having a second radial bearing surface on a first inner peripheral surface, and a sealing member fixed to the rotating main body, formed in a cylindrical shape, located around the small-diameter section, and having a second outer peripheral surface, a second inner peripheral surface, a capture concave surface that opens in the second inner peripheral surface and is recessed toward the second outer peripheral surface to capture the lubricant, and a through hole, the lubricant is filled in a gap between the stationary shaft and the rotating body, and forms a radial sliding bearing of a dynamic pressure type together with the first radial bearing surface and the second radial bearing surface, the through hole has a first opening that opens in the capture concave surface and a second opening that opens in a surface other than the second inner peripheral surface and the capture concave surface of the sealing member, is formed through the sealing member from the first opening to the second opening, and connects a space surrounded by the capture concave surface to a first gap between the first radial bearing surface and the second radial bearing surface, assuming in a direction perpendicular to the rotation axis, a longest distance from the rotation axis to the first opening is set as a first distance and a longest distance from the rotation axis to the second opening is set as a second distance, the second distance is equal to or longer than the first distance, a second gap is formed between the first inner peripheral surface and the second outer peripheral surface, the capture concave surface includes a bottom surface located alongside the second outer peripheral surface, the first opening opens in the bottom surface of the capture concave surface, the second opening opens in the second outer peripheral surface, and the second gap connects the through hole to the first gap.

2. The sliding bearing unit of claim 1, wherein the large-diameter section includes a first thrust bearing surface opposed to the sealing member, the sealing member includes a second thrust bearing surface opposed to the first thrust bearing surface, and the lubricant forms a thrust sliding bearing of a dynamic pressure type together with the first thrust bearing surface and the second thrust bearing surface.

3. The sliding bearing unit of claim 1, wherein the first radial bearing surface has a smooth plain surface and a plurality of raking concave surfaces each of which is opened in the plain surface and recessed toward the rotation axis to rake the lubricant, the plurality of raking concave surfaces each includes a bottom surface located alongside the rotation axis, and assuming in a direction perpendicular to the rotation axis,
a distance from the rotation axis to the bottom surface
of each of the plurality of raking concave surfaces is set
as a third distance, the third distance is equal to or
longer than the second distance.

4. The sliding bearing unit of claim 1, wherein
the first radial bearing surface has a smooth plain surface
and a plurality of raking concave surfaces each of
which is opened in the plain surface and recessed
toward the rotation axis to rake the lubricant,
the plurality of raking concave surfaces each includes a
bottom surface located alongside the rotation axis, and
assuming in a direction perpendicular to the rotation axis,
a distance from the rotation axis to the bottom surface
of each of the plurality of raking concave surfaces is set
as a third distance, the third distance is shorter than the
second distance.

5. The sliding bearing unit of claim 1, wherein
the sealing member further has a reservoir concave sur-
face which is opened in the second outer peripheral
surface and recessed toward the second inner peripheral
surface to store the lubricant,
the second opening opens in the reservoir concave sur-
face, and
the reservoir concave surface and the second gap connect
the through hole to the first gap.

6. The sliding bearing unit of claim 1, wherein
the rotating main body includes
a first cylinder extending along the rotation axis to be
formed in a cylindrical shape, and located around the
large-diameter section, and
a second cylinder extending along the rotation axis to
be formed in a cylindrical shape, located between the
large-diameter section and the first cylinder, having
the first inner peripheral surface including the second
radial bearing surface, and having a rotation opera-
tion restricted so as not to rotate relative to the first
cylinder,
the sealing member is fixed to the first cylinder, and
the lubricant is filled in a plurality of gaps between the
stationary shaft, the first cylinder and the second cyl-
inder.

7. The sliding bearing unit of claim 1, wherein
the first radial bearing surface has a smooth plain surface
and a plurality of raking concave surfaces each of
which is opened in the plain surface and recessed
toward the rotation axis to rake the lubricant,
the plurality of raking concave surfaces each includes a
bottom surface located alongside the rotation axis, and
assuming in a direction perpendicular to the rotation axis,
a distance from the rotation axis to the bottom surface
of each of the plurality of raking concave surfaces is set
as a third distance, the third distance is equal to or
longer than the first distance.

8. A sliding bearing unit comprising:
a stationary shaft extending along a rotation axis and
including a large-diameter section having a first radial
bearing surface on a first outer peripheral surface and a
small-diameter section integrally formed with the
large-diameter section as one unit and having a second
outer diameter that is smaller than a first outer diameter
of the large-diameter section;
a rotating body that is rotatable around the stationary
shaft; and
a lubricant, wherein
the rotating body includes
a rotating main body extending along the rotation axis
to be formed in a cylindrical shape, located around
the large-diameter section, and having a second
radial bearing surface on a first inner peripheral
surface, and
a sealing member fixed to the rotating main body,
formed in a cylindrical shape, located around the
small-diameter section, and having a second outer
peripheral surface, a second inner peripheral surface,
a capture concave surface that opens in the second
inner peripheral surface and is recessed toward the
second outer peripheral surface to capture the lubri-
cant, and a through hole,
the lubricant is filled in a gap between the stationary shaft
and the rotating body, and forms a radial sliding bearing
of a dynamic pressure type together with the first radial
bearing surface and the second radial bearing surface,
the through hole has a first opening that opens in the
capture concave surface and a second opening that
opens in a surface other than the second inner periph-
eral surface and the capture concave surface of the
sealing member, is formed through the sealing member
from the first opening to the second opening, and
connects a space surrounded by the capture concave
surface to a first gap between the first radial bearing
surface and the second radial bearing surface,
assuming in a direction perpendicular to the rotation axis,
a longest distance from the rotation axis to the first
opening is set as a first distance and a longest distance
from the rotation axis to the second opening is set as a
second distance, the second distance is equal to or
longer than the first distance,
the stationary shaft further includes a flange section which
is located alongside the first outer peripheral surface
and integrally formed with the large-diameter section
as one unit,
the flange section includes a first thrust bearing surface
and a third thrust bearing surface located opposite to
the first thrust bearing surface in a direction along the
rotation axis,
the rotating body has a second thrust bearing surface
opposed to the first thrust bearing surface and a fourth
thrust bearing surface opposed to the third thrust bear-
ing surface,
the lubricant forms a first thrust sliding bearing of a
dynamic pressure type together with the first thrust
bearing surface and the second thrust bearing surface,
the lubricant forms a second thrust sliding bearing of a
dynamic pressure type together with the third thrust
bearing surface and the fourth thrust bearing surface,
a third gap is formed between the large-diameter section
and the sealing member in a direction along the rotation
axis,
the capture concave surface includes a bottom surface
located alongside the second outer peripheral surface,
the sealing member includes an annular section having a
first end surface that is part of the capture concave
surface and a second end surface which is located
opposite to the first end surface in the direction along
the rotation axis and opposed to the large-diameter
section,
the first opening opens in at least one of the first end
surface and the bottom surface of the capture concave
surface, the second opening opens in the second end surface, is opposed to the large-diameter section, and is not opposed to the first thrust bearing surface or the third thrust bearing surface, and the third gap connects the through hole to the first gap.

9. A rotating anode X-ray tube comprising:

a sliding bearing unit including a stationary shaft extending along a rotation axis and including a large-diameter section having a first radial bearing surface on a first outer peripheral surface and a small-diameter section integrally formed with the large-diameter section as one unit and having a second outer diameter that is smaller than a first outer diameter of the large-diameter section, a rotating body that is rotatable around the stationary shaft, and a lubricant;

an anode target fixed to the rotating body;

a cathode opposed to the anode target; and an envelope which houses the sliding bearing unit, the anode target and the cathode and which fixes the stationary shaft, wherein the rotating body includes a rotating main body extending along the rotation axis to be formed in a cylindrical shape, located around the large-diameter section, and having a second radial bearing surface on a first inner peripheral surface, and a sealing member fixed to the rotating main body, formed in a cylindrical shape, located around the small-diameter section, and having a second outer peripheral surface, a second inner peripheral surface, a capture concave surface that opens in the second inner peripheral surface and is recessed toward the second outer peripheral surface to capture the lubricant, and a through hole, the lubricant is filled in a gap between the stationary shaft and the rotating body, and forms a radial sliding bearing of a dynamic pressure type together with the first radial bearing surface and the second radial bearing surface, the through hole has a first opening that opens in the capture concave surface and a second opening that opens in a surface other than the second inner peripheral surface and the capture concave surface of the sealing member, is formed through the sealing member from the first opening to the second opening, and connects a space surrounded by the capture concave surface to a first gap between the first radial bearing surface and the second radial bearing surface, assuming in a direction perpendicular to the rotation axis, a longest distance from the rotation axis to the first opening is set as a first distance and a longest distance from the rotation axis to the second opening is set as a second distance, the second distance is equal to or longer than the first distance, a second gap is formed between the first inner peripheral surface and the second outer peripheral surface, the capture concave surface includes a bottom surface located alongside the second outer peripheral surface, the first opening opens in the bottom surface of the capture concave surface, the second opening opens in the second outer peripheral surface, and the second gap connects the through hole to the first gap.

10. The rotating anode X-ray tube of claim 9, wherein the large-diameter section includes a first thrust bearing surface opposed to the sealing member, the sealing member includes a second thrust bearing surface opposed to the first thrust bearing surface, and the lubricant forms a thrust sliding bearing of a dynamic pressure type together with the first thrust bearing surface and the second thrust bearing surface.

11. The rotating anode X-ray tube of claim 9, wherein:

the first radial bearing surface has a smooth plain surface and a plurality of raking concave surfaces each of which is opened in the plain surface and recessed toward the rotation axis to rake the lubricant, the plurality of raking concave surfaces each includes a bottom surface located alongside the rotation axis, and assuming in a direction perpendicular to the rotation axis, a distance from the rotation axis to the bottom surface of each of the plurality of raking concave surfaces is set as a third distance, the third distance is equal to or longer than the second distance.

12. The rotating anode X-ray tube of claim 9, wherein the first radial bearing surface has a smooth plain surface and a plurality of raking concave surfaces each of which is opened in the plain surface and recessed toward the rotation axis to rake the lubricant, the plurality of raking concave surfaces each includes a bottom surface located alongside the rotation axis, and assuming in a direction perpendicular to the rotation axis, a distance from the rotation axis to the bottom surface of each of the plurality of raking concave surfaces is set as a third distance, the third distance is shorter than the second distance.

13. The rotating anode X-ray tube of claim 9, wherein the sealing member further has a reservoir concave surface which is opened in the second outer peripheral surface and recessed toward the second inner peripheral surface to store the lubricant, the second opening opens in the reservoir concave surface, and the reservoir concave surface and the second gap connect the through hole to the first gap.

14. The rotating anode X-ray tube of claim 9, wherein the rotating main body includes a first cylinder extending along the rotation axis to be formed in a cylindrical shape, and located around the large-diameter section, and a second cylinder extending along the rotation axis to be formed in a cylindrical shape, located between the large-diameter section and the first cylinder, having the first inner peripheral surface including the second radial bearing surface, and having a rotation operation restricted so as not to rotate relative to the first cylinder, the sealing member is fixed to the first cylinder, and the lubricant is filled in a plurality of gaps between the stationary shaft, the first cylinder and the second cylinder.

15. The rotating anode X-ray tube of claim 9, wherein the first radial bearing surface has a smooth plain surface and a plurality of raking concave surfaces each of which is opened in the plain surface and recessed toward the rotation axis to rake the lubricant, the plurality of raking concave surfaces each includes a bottom surface located alongside the rotation axis, and assuming in a direction perpendicular to the rotation axis, a distance from the rotation axis to the bottom surface of each of the plurality of raking concave surfaces is set as a third distance, the third distance is equal to or longer than the first distance.

16. A rotating anode X-ray tube comprising:

a sliding bearing unit including a stationary shaft extending along a rotation axis and including a large-diameter section having a first radial bearing surface on a first outer peripheral surface and a small-diameter section integrally formed with the large-diameter section as one unit and having a second outer diameter that is smaller than a first outer diameter of the large-diameter section, a rotating body that is rotatable around the stationary shaft, and a lubricant;

an anode target fixed to the rotating body;

a cathode opposed to the anode target; and an envelope which houses the sliding bearing unit, the anode target and the cathode and which fixes the stationary shaft, wherein the rotating body includes a rotating main body extending along the rotation axis to be formed in a cylindrical shape, located around the large-diameter section, and having a second radial bearing surface on a first inner peripheral surface, and a sealing member fixed to the rotating main body, formed in a cylindrical shape, located around the small-diameter section, and having a second outer peripheral surface, a second inner peripheral surface, a capture concave surface that opens in the second inner peripheral surface and is recessed toward the second outer peripheral surface to capture the lubricant, and a through hole, the lubricant is filled in a gap between the stationary shaft and the rotating body, and forms a radial sliding bearing of a dynamic pressure type together with the first radial bearing surface and the second radial bearing surface, the through hole has a first opening that opens in the capture concave surface and a second opening that opens in a surface other than the second inner peripheral surface and the capture concave surface of the sealing member, is formed through the sealing member from the first opening to the second opening, and connects a space surrounded by the capture concave surface to a first gap between the first radial bearing surface and the second radial bearing surface, assuming in a direction perpendicular to the rotation axis, a longest distance from the rotation axis to the first opening is set as a first distance and a longest distance from the rotation axis to the second opening is set as a second distance, the second distance is equal to or longer than the first distance, the stationary shaft further includes a flange section which is located alongside the first outer peripheral surface and integrally formed with the large-diameter section as one unit, the flange section includes a first thrust bearing surface and a third thrust bearing surface located opposite to the first thrust bearing surface in a direction along the rotation axis, the rotating body has a second thrust bearing surface opposed to the first thrust bearing surface and a fourth thrust bearing surface opposed to the third thrust bearing surface, the lubricant forms a first thrust sliding bearing of a dynamic pressure type together with the first thrust bearing surface and the second thrust bearing surface, the lubricant forms a second thrust sliding bearing of a dynamic pressure type together with the third thrust bearing surface and the fourth thrust bearing surface, a third gap is formed between the large-diameter section and the sealing member in a direction along the rotation axis, the capture concave surface includes a bottom surface located alongside the second outer peripheral surface, the sealing member includes an annular section having a first end surface that is part of the capture concave surface and a second end surface which is located opposite to the first end surface in the direction along the rotation axis and opposed to the large-diameter section, the first opening opens in at least one of the first end surface and the bottom surface of the capture concave surface, the second opening opens in the second end surface, is opposed to the large-diameter section, and is not opposed to the first thrust bearing surface or the third thrust bearing surface, and the third gap connects the through hole to the first gap.

* * * * *